United States Patent [19]

Asano et al.

[11] 4,329,577
[45] May 11, 1982

[54] FOCUS DETECTING DEVICE WITH PHOTO-SENSOR ARRAY

[75] Inventors: Noriyuki Asano, Kawasaki; Yukichi Niwa; Mitsutoshi Ohwada, both of Yokohama; Takaaki Yamagata, Tokyo; Shin Tsuda, Kawagoe, all of Japan

[73] Assignee: Canon Kabushiki Kaisha, Tokyo, Japan

[21] Appl. No.: 974,421

[22] Filed: Dec. 29, 1978

Related U.S. Application Data

[63] Continuation of Ser. No. 819,235, Jul. 26, 1977, abandoned.

[30] Foreign Application Priority Data

Jul. 27, 1976 [JP] Japan .................................. 51/89492

[51] Int. Cl.³ ............................................. G01J 1/20
[52] U.S. Cl. ..................................... 250/201; 250/204
[58] Field of Search ............ 250/201, 204, 209, 211 J, 250/578; 354/25; 356/1, 4, 5

[56] References Cited

U.S. PATENT DOCUMENTS

| | | | |
|---|---|---|---|
| 4,004,852 | 1/1977 | Pentecost | 354/25 |
| 4,005,443 | 1/1977 | Albrecht | 250/209 |
| 4,047,187 | 9/1977 | Mashimo et al. | 250/201 |
| 4,078,171 | 3/1978 | Stauffer | 250/201 |

*Primary Examiner*—David C. Nelms
*Attorney, Agent, or Firm*—Toren, McGeady & Stanger

[57] ABSTRACT

A focus detecting device which performs focus detection in such a manner that an image of an object formed through an image forming lens is received by an array of many electric charge storing type photo-sensors and, under such a condition, the image is electrically scanned by extracting, in a time serial manner, the output of each photo-sensor, and then the sharpness of the image is detected from a scanning output thus obtained; or that two images of the object which are formed through a range-finding optical system with an apparent parallax corresponding to distance to the object are received by different arrays of such photo-sensors respectively and, under such a condition, the two images are electrically scanned separately from each other by extracting, in a time serial manner, the output of each of the photo-sensors and scanning outputs thus obtained are compared with each other to detect the relative parallax of the two images. In this device, for making the scanning output of the photo-sensor array or arrays always correct irrespective of variation in the brightness of the object, the scanning recycle time duration of the photo-sensor array or arrays is automatically adjusted according to the brightness of the object; and, accordingly, the electric charge storing time of each photo-sensor in the photo-sensor array or arrays are automatically adjusted thereby.

64 Claims, 21 Drawing Figures

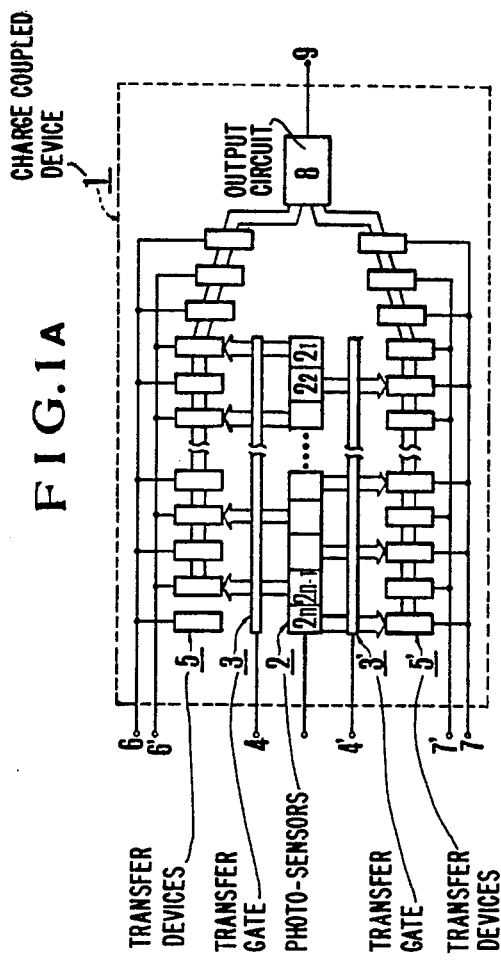

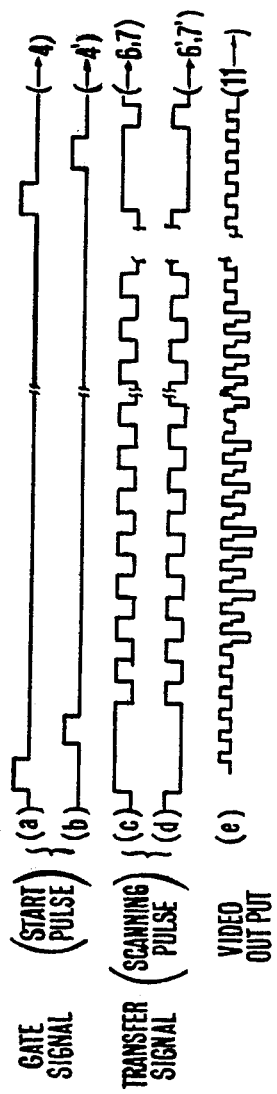

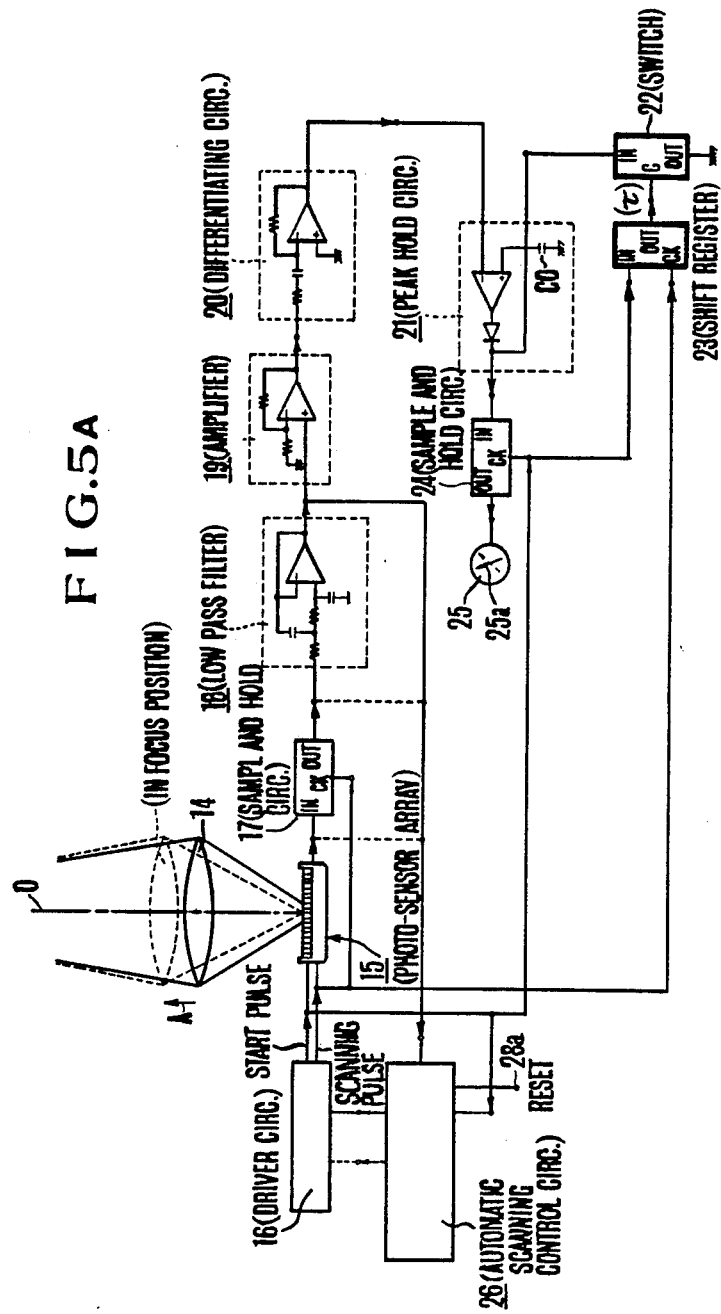

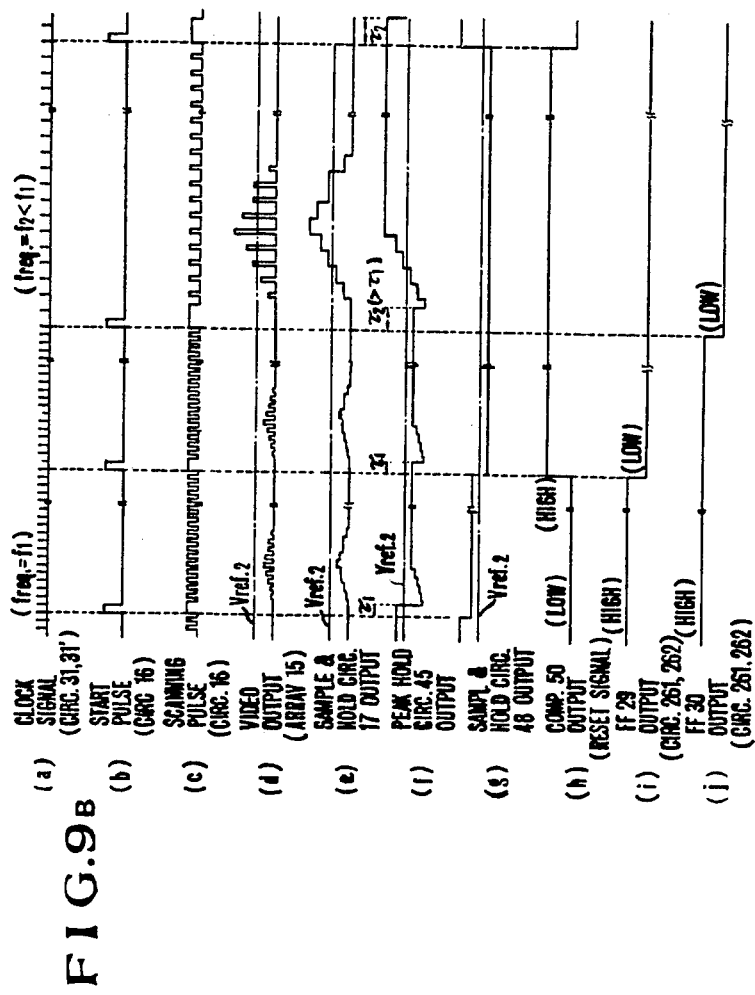

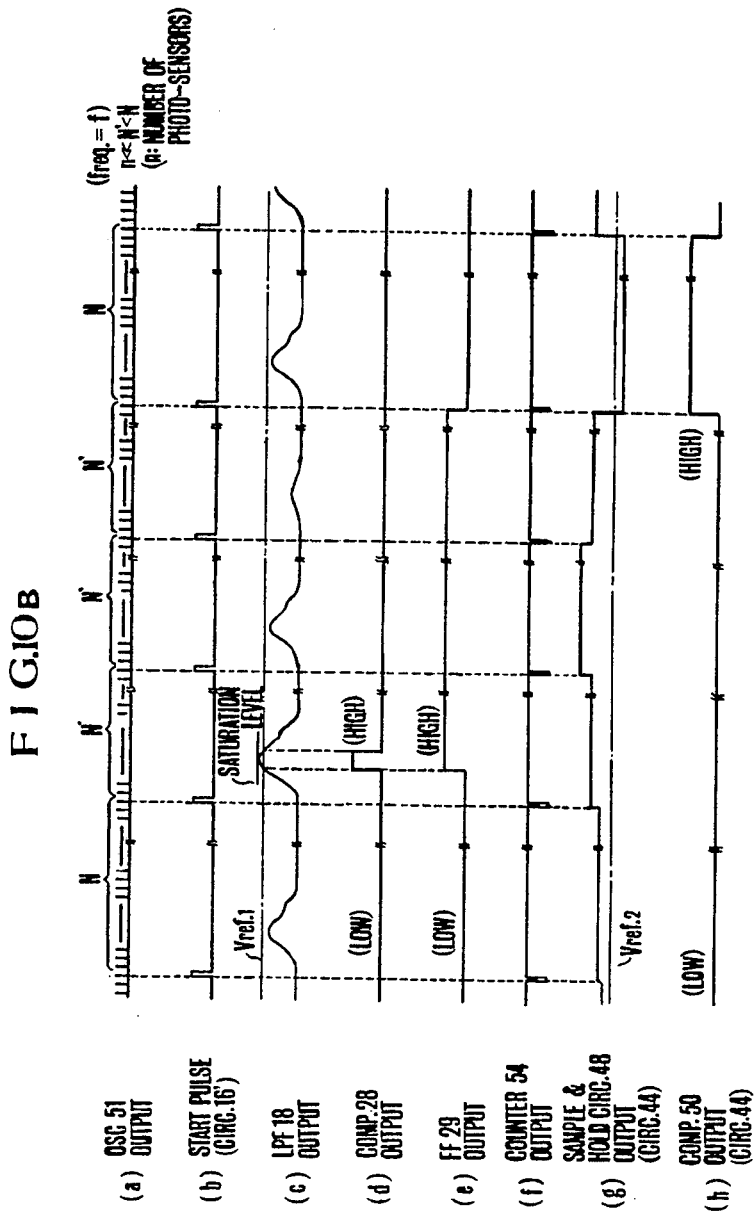

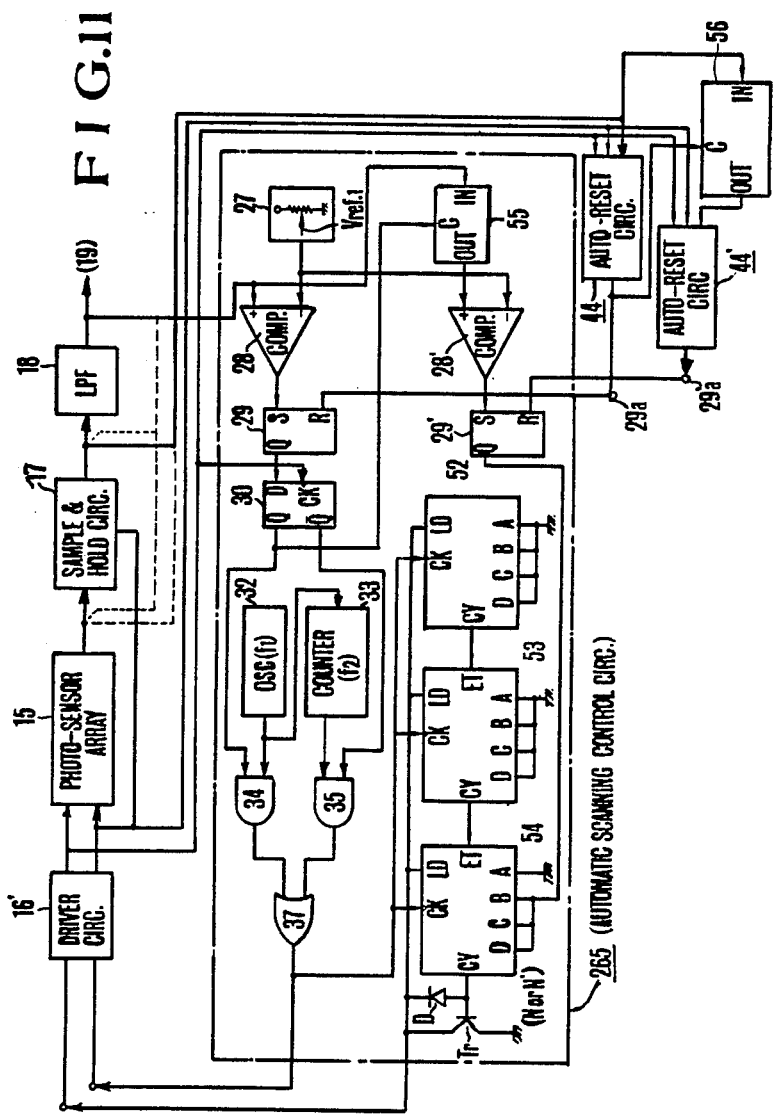

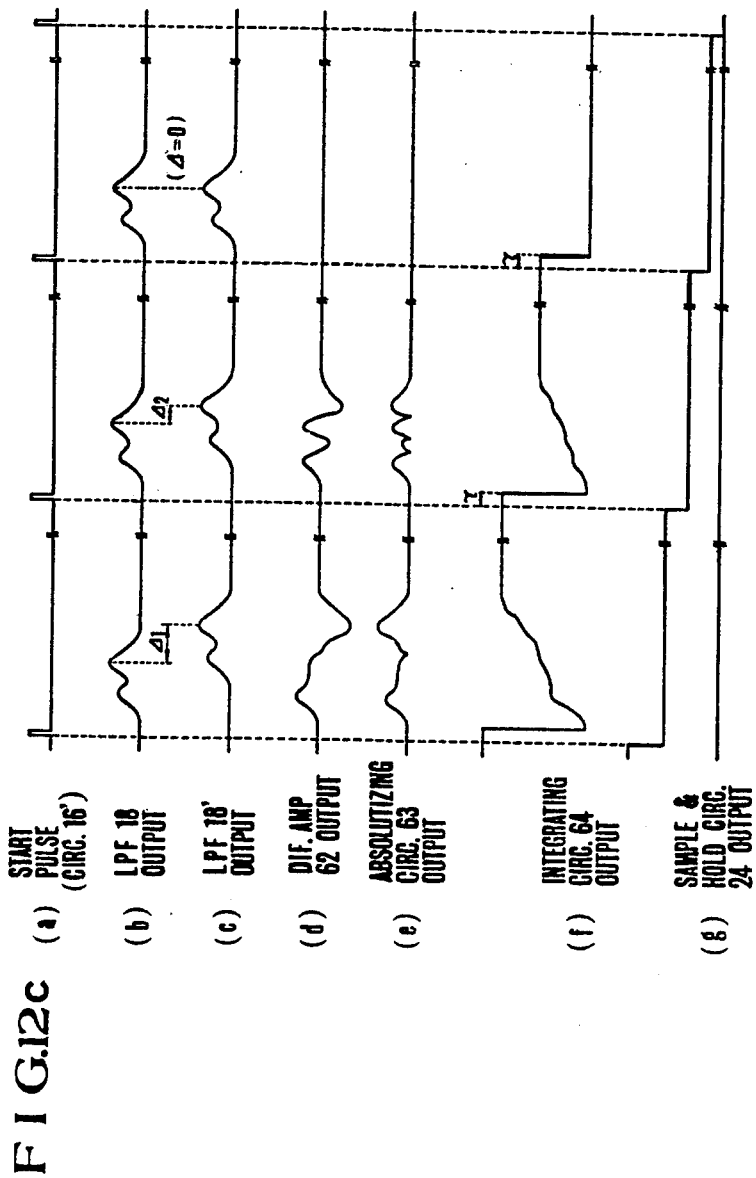

FOCUS DETECTING DEVICE WITH PHOTO-SENSOR ARRAY

This is a continuation of application Ser. No. 819,235 filed on July 26, 1977, now abandoned.

BACKGROUND OF THE INVENTION

1. Field of the Invention

This invention relates to a focus detecting device using one or more arrays of photo-sensors and more particularly to an improvement in a focus detecting device of a type wherein focus detection is performed by receiving one or more images of an object formed through image forming optical means with one or more arrays of many electric charge storing type photo-sensors, or one or more photo-sensor arrays, which operate in an electric charge storing mode; then, by extracting, the output of each of the photo-sensors in a time serial manner, to electrically scan the image or images received by them; and then by processing the output or outputs of such scanning in a suitable manner.

2. Description of the Prior Art

In a focus detecting device of a type well known in the art, an image forming lens forms an image of an object on a photo-electric transducing element which changes its output (an internal resistance value) according as the sharpness of the image changes and, in a process of moving the lens along its optical axis, a just focus is attained when the output (the internal resistance value) of the photo-electric transducing element has reached its extreme value.

In another type of focus detecting device which is also well known in the art, two images of an object are formed respectively on different photo-electric transducing elements through a range finding optical system, with apparent parallax corresponding to the distance to the object, and, in a process of shifting one image toward the other in response to a focus adjusting operation of an objective lens, a just focus is attained when the outputs (internal resistance values) of the two transducing elements have come to coincide with each other or, in other words, when the positions of the two images have come to coincide with each other.

In the meantime, rapid advancement of semiconductor technology has made commerically available, at relatively low prices, photo-sensor arrays, such as a photo-diode array (MOS-image sensor), CCD (a charge coupled device), BBD (a bucket brigade device), etc. The photo-sensor array, such as a CCD or a BBD is composed of many photo-sensors of an electric charge storing type. The output of each of these charge storing photo-sensors can be taken out one after another in a time serial manner by applying a start pulse and scanning pulses through a driver circuit. Accordingly, with such a photo-sensor array employed, a video signal accurately representing an image of an object formed by an image forming lens is obtainable by scanning, in a purely electrical manner, the image of the object, so that focus detection can be accomplished with higher accuracy thereby.

Therefore, in view of such an advantageous function of a photo-sensor array, there have been made many attempts to utilize such a photo-sensor array for focus detection.

As for an example of an improvement over the former type of the two conventionally known types of focus detecting devices mentioned in the foregoing, a device has been proposed by the same assignee of the present invention under U.S. patent application Ser. No. 563,462, filed on Mar. 31, 1976, entitled "A SYSTEM FOR EXPOSURE MEASUREMENT AND/OR FOCUS DETECTION BY MEANS OF IMAGE SENSOR". In this device, an image of an object formed by an image forming lens on an area type photo-sensor array (a matrix sensor array) and, under such a condition, the outputs of the photo-sensors are taken out in time series and then are converted into digital values one after another by an analog-to-digital convertor. Then, the difference between the digital converted output signals of a pair of sensors which are adjoining each other in the array are obtained in absolute value by means of a subtracter. The difference signals thus obtained from all of the sensors in the sensor array are accumulated by an accumulator in one scanning operation and the results of the accumulation is used as information on image sharpness.

And as for an example of improvement over the latter of the two types of conventional focus detecting devices mentioned in the foregoing, a device has been proposed by the same assignee of the present invention for U.S. Pat. No. 3,898,676, entitled "DISTANCE DETECTING DEVICE". In this device, two images of an object are formed through a range finding optical system with apparent parallax corresponding to the distance to the object and are respectively received by different photo-sensor arrays. Under such a condition, the output of each sensor is simultaneously taken out by time seriating means in a time serial manner. After these outputs are sampled and held by means of a sample-and-hold circuit, they are converted by a low pass filter into wave form signals. Then, the phase difference between the outputs of these photo-sensor array is detected by means of a phase discriminator. A motor is actuated by the output of the phase discriminator to shift objective lens means along its optical axis. Then, in response thereto, one of the two images is shifted toward the other and thus a just focus is attained when the phase difference between the wave form signals from the two sensor arrays becomes zero or, in other words, when the positions of the images relatively come to coincide with each other.

On the other hand, when irradiated with light, the electric charge storing type photo-sensors that constitute a photo-sensor array, such as a CCD or a BBD are capable of storing electric charge proportional to the integrated amount of the incident light (intensity of light × time) at a speed corresponding to the intensity of the incident light. Generally, such a photo-sensor is applied in such a manner that, after electric charge is discharged, electric charge corresponding to the integrated amount of incident light received during a period of time before next discharge is stored therein. Accordingly, the above stated period of time is regarded as electric charge storing time of a photo-sensor. However, a storable quantity of electric charge is a photo-sensor, i.e. an electric charge saturation level, is predetermined and, as generally known, after such a saturation level is exceeded, an excess of electric charge flows out to mix in other photo-sensors. This is known as a "blooming" effect, which makes it hardly possible to obtain correct video signals.

In addition to such a problem, when the quantity of the electric charge stored in a photo-sensor is extremely small, the S/N ratio (signal to noise ratio) against a dark current and the like becomes too low for obtaining a correct picture element signal.

Where a photo-sensor array comprising such electric charge storing type photo-sensors is used for a focus detecting device, therefore, the electric charge stored in each photo-sensor must be controlled so as not to exceed its saturation level irrespective of variation in the brightness of an object and, also for making the S/N ratio sufficiently high for unfailingly obtaining a correct video signal, the integrated amount of light to be received by the photo-sensor must be adjusted to a suitable degree. Without such arrangement, it is hardly possible to make focus detection with high accuracy using such a photo-sensor array.

SUMMARY OF THE INVENTION

In view of the above stated problems of the conventional devices, therefore, a principal object of this invention is to provide a novel focus detecting device which uses one or more arrays of many electric charge storing type photo-sensors, or one or more photo-sensor arrays operative in an electric charge storing mode and which always gives a correct video signal of the image irrespective of variation in the brightness of an object so that focus detection can be unfailingly accomplished with high accuracy.

Another object of this invention is to provide an improved focus detecting device which uses such a photo-sensor array or arrays and which scans an image while automatically adjusting the quantity of electric charge stored in each photo-sensor so as not to exceed its saturation level, particularly in the case of a very bright object, so that a correct video signal of the image can be always obtained for focus detection.

Still another object of this invention is to provide a focus detecting device which uses such a photo-sensor array or arrays and which ensures a correct video signal of the image irrespective of variation in the brightness of an object by automatically adjusting the amount of light received by each photo-sensor in the photo-sensor array or arrays according to the object's brightness.

In accordance with this invention, these objects are attained by automatically adjusting the electric charge storing time of each photo-sensor in the photo-sensor array or arrays according to the brightness of an object to automatically effect thereby adjustment of the amount of light received by each photo-sensor in such a manner that a correct video signal of the image can be always obtained irrespective of variation in the brightness of the object for highly accurate focus detection. The term "electric charge storing time" as used here means, as mentioned in the foregoing, a period of time from discharge of the electric charge to the time when the electric charge is again discharged and can be also regarded as length of time duration for which light is received by each photo-sensor. Accordingly, the electric charge storing time is automatically adjusted by shortening it for a bright object and lengthening it for a dark object, so that the amount of light received by each photo-sensor can be automatically adjusted according to the brightness of the object. Compared with a method of, for example, directly adjusting the amount of light received by each photo-sensor through mechanical means, such as a diaphragm aperture, the method of this invention is very advantageous, because the amount of light received by each photo-sensor can be more accurately adjusted in a purely electrical manner thus dispensing with the use of a complex mechanical arrangement.

A further object of this invention is to provide a circuit arrangement which performs automatic adjustment of the electric charge storing time of each photo-sensor in accordance with the brightness of an object. In various embodiments of the invention in relation to this object, the electric charge storing time of photo-sensors is adjusted by automatically changing the scanning recycle time duration in scanning an image through the photo-sensor array or arrays according to the brightness of the object. For driving the photo-sensor array, both start pulses and scanning pulses are necessary. The start pulses are applied for starting the scanning process. Following this, when scanning pulses are applied, each photo-sensor is electrically driven by a corresponding scanning pulse one after another. Then, the interval of the start pulse generating cycle corresponds exactly to a scanning recycle time duration while the electric charge storing time of each photo-sensor in the photo-sensor array is dependent on the scanning recycle time duration. In this case, after one start pulse is generated, the number of clock signals produced by an oscillator to correspond to scanning pulses is counted. When the count value reaches a certain setting value (which is of course a value sufficiently greater than the number of photo-sensors included in the photo-sensor array), another start pulse is generated for starting the next scanning process. Accordingly, if, for example, the frequency of the clock signals from the oscillator which defines the frequency of the scanning pulses is changed according to the brightness of the object, this changes the interval of the start pulse generating cycle and, in turn, the scanning recycle time duration is altered to change the electric charge storing time of the photo-sensors according to the brightness of the object.

On the other hand, it is also possible to alter the start pulse generating cycle interval without changing the frequency of the clock signals for producing the scanning pulses. As mentioned in the foregoing, the start pulse generating cycle is in a predetermined relation to the number of scanning pulses to be generated. When the object is bright, the count value of the clock signals from the oscillator corresponding to the scanning pulses generated during the period from generation of one start pulse to generation of another start pulse is shifted to a smaller setting value than the above stated setting value, although this smaller setting value also must be a value greater than the number of the photo-sensors included in the photo-sensor array. In this case, the start pulse generating cycle interval, or a scanning recycle time duration, naturally becomes shorter and, accordingly, the electric charge storing time is shortened thereby.

In one of the various preferred embodiments of this invention, there is provided a circuit arrangement for altering the frequency of the scanning pulses and the start pulse generating cycle separately from each other. Compared with other arrangement of altering either one of the frequency of scanning pulses or the start pulse generating cycle, this arrangement is more advantageous in respect that this permits finer adjustment of the above stated electric charge storing time.

The above and further objects and novel features of this invention will more apparent from the following detailed description when the same is read in connection with the accompanying drawings illustrating preferred embodiments thereof.

BRIEF DESCRIPTION OF THE DRAWINGS

FIG. 1A is a schematic illustration of a basic construction of a CCD (a charge coupled device) as an example of the electric charge storing type photo-sensor array usable in accordance with this invention.

FIG. 1B is a signal wave form chart showing the wave form of a driving signal to be applied to the CCD shown in FIG. 1A and the wave form of a video signal obtained therefrom.

FIG. 5A is a circuit diagram illustrating an embodiment of this invention based on the principle illustrated in FIG. 2 through FIG. 4 and particularly the electrical circuit arrangement of the embodiment.

FIG. 9B is a wave form chart showing the wave form of the output signal produced from each circuit block in the focus detecting device and the automatic resetting circuit shown in FIG. 9A when the focus detecting device is in operation.

FIG. 10B is a wave form chart showing the wave form of the output signal produced from each circuit block in the focus detecting device, the automatic scanning control circuit shown in FIG. 10A and the automatic resetting circuit when the focus detecting device is in operation.

FIG. 11 is a circuit diagram illustrating a fifth example of the automatic scanning control circuit, wherein the control circuit shown in FIG. 6A is arranged in combination with the control circuit shown in FIG. 10A to permit control in more finely divided steps.

FIG. 12C is a wave form chart showing the wave form of the output signal produced from each circuit block in this focus detecting device when the focus detecting device is in operation.

DETAILED DESCRIPTION OF THE PREFERRED EMBODIMENTS

Figure 2:
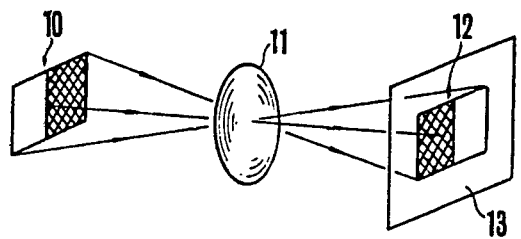
FIG. 2 is a schematic illustration of the relation of an object to an image of the object to be formed on a screen through a lens.

Referrring to FIGS. 1A and 1B, the basic construction and the operation principle of a charge coupled device (hereinafter will be called "CCD" for short) are described below as a typical example of the electric charge storing type photo-sensor arrays that are usable in practicing this invention. CCD is a MOS capacitor type semiconductor device which is basically composed of electrodes of aluminum or the like aligned through an insulator made of $SiO_2$ or the like on a semiconductor base plate made of Si (silicon) and is caused to store electric charge by light applied to its depletion layer which is produced when a voltage is supplied to the electrodes. Then, an electric field is applied so as to move the stored charge by supplying different voltages on the other electrodes. The CCD performs combined functions including storing electric charge in response to light, i.e. a light-to-electric converting function and transferring the stored electric charge, i.e. a self-scanning function. The CCD is not only usable for detection of the brightness of an image in time series by arranging it into an arrayed type but also usable for secondary detection of shading distribution in an image.

In FIG. 1A, a reference numeral 1 denotes the CCD in its entirely; 2 denotes a photo-sensor part in the CCD consisting of "n" number of sensors $2_1$ through $2_n$. Reference numerals 3 and 3' denote transfer gates which are disposed on both sides of the photo-sensor part 2 and which serve to transfer the electric charge stored in the photo-sensor part 2 to transfer parts 5 and 5' when gate signals (start pulses (a) and (b) as shown in FIG. 1B) are supplied through the input terminals 4 and 4'. When transfer signals (scanning pulses (c) and (d) as shown in FIG. 1B) are supplied to the input terminals 6, 6', 7 and 7' of the transfer parts 5 and 5', electric charges in the transfer parts 5 and 5' are gradually transferred toward the output side thereof. Thus, the electric charges of the sensors are gradually supplied to an output part 8 with the electric charge of sensor disposed closer to the output side first supplied and those of sensors disposed farther away from the output side supplied later. These electric charges are thus taken out as a time series signal (shown at (e) in FIG. 1B) from an output terminal 9 connected to the output part 8. To effect the gradual transfer of electric charges one after another to the output side, there must be provided a part that has no electric charge between one stage and another arranged in each of these transfer parts 5 and 5'. And for this purpose, the signals of the photo-sensor part 2 are divided into two channels to transfer the signals in odd number order separately from those in even number order and then are combined at the output part 8.

The gates signals (start pulses) and the transfer signals (scanning pulses) which are required for driving the CCD 1, and the time seriated output of the CCD 1 which are obtained from the transfer signals are as shown in FIG. 1B. In FIG. 1B, (a) and (b) respectively represent the gate signals (start pulses) to be supplied from the input terminals 4 and 4' to transfer gates 3 and 3'; and (c) and (d) represent the transfer signals (scanning pulses) to be supplied from the input terminals 6, 7, 6' and 7' to the transfer parts 5 and 5'. Then, equal interval signals produced during the period of transfer of the transfer signals correspond to the clock signals from the oscillator. Further, after a gate signal is produced, the number of the clock signals of the oscillator which correspond to the transfer signals is counted and the next gate signal is produced when the count value reaches a predetermined value, which is greater than the number n of the sensors $2_1$-$2_n$ included in the photo-sensor part 2. Then, the light receiving time, i.e. the electric charge storing time, of the sensors $2_1$-$2_n$ at the photo-sensor part 2 is definitely dependent on the scanning recycle time duration corresponding to the cyclic interval at which the gate signals (a) and (b) are generated. On the other hand, the generating cycle of the gate signals (a) and (b) is dependent on the frequency of the clock signals produced by the oscillator.

The wave form (e) represents a time series signal produced through the output part 8. The time series signal (e) is a composite signal composed of the electric charges which are transferred by the transfer signals (c) and (d) and are supplied into the output part 8 from the sensors disposed closer to the output side.

Accordingly with an image of an object formed on the light receiving face of the CCD 1, when the CCD 1 is driven by suppling the gate signals (a) and (b) and the transfer signals (c) and (d), signals each of which corresponds to the brightness of each corresponding minutes video portion of the image are produced one after another by the CCD 1 and video signals of the image are thus obtained by scanning the image.

The operation principle of CCD is as described in the foregoing. BBD (a bucket brigade device) also operates almost in the same manner as CCD. In the case of a photo-diode array which operates in a charge storing mode, the above stated scanning pulses are used as shift pulses for a shift register to cause the shift register to shift stepwise, one step after another, so that the output of each photo-diode can be taken out in a time serial manner with an analog switch which is connected to each photo-diode being operated on and off. The details of such arrangement are described in the Data Catalog of the Fairchild Co. "Self-Scanned Linear Photodiode Arrays, FPA 601/602", dated March 1971 and the operation principle thereof will be explained hereinafter. Therefore, with BBD or such a photo-diode array used, video signals of an image can be obtained by electrically scanning the image in the almost same manner as in the case of CCD.

The function of the photo-sensor array, such as CCD, BBD or photo-diode array, being as described in the foregoing, the principle in the use of the photo-sensor array for a focus detecting device which performs focus detection, for example, by detecting variation in the sharpness of an image will be understood from the following description with references made in FIGS. 2-4.

Figures 3A, 3B:
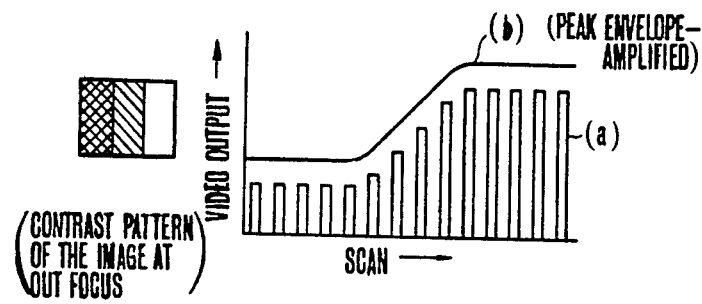
FIG. 3A illustrates the condition of an image formed on a screen when the lens is not correctly focussed at an image forming system shown in FIG. 2.
FIG. 3B is a graph illustrating a video signal obtained by electrically scanning the image shown in FIG. 3A, using, for example, the CCD shown in FIG. 1A.

First referring to FIG. 2 which illustrates the relation of an object to its image formed on a screen by a lens, a reference numeral 10 denotes an object having a certain shading pattern. An image forming lens 11 is used for forming an image 12 of the object 10 on a screen 13. Depending on the position of the image forming lens 11, when the image 12 on the screen 13 is out of focus, there is an area of intermediate brightness between the brightest area and the darkest area in the image on the screen 13 as shown in FIG. 3A. When the position of the image forming lens is adjusted along its optical axis to focus it on the screen 13, there is obtained on the screen 13 a sharp image 12 having a shading pattern similar to the shading pattern of the object 10 as shown in FIG. 4A.

Therefore, with the above stated photo-sensor array arranged in the position of the screen 13, when the image is electrically scanned by means of the photo-sensor array, the video output obtained from the photo-sensor array becomes as shown in the histogram (a) of FIG. 3B if the pattern of the image is as shown in FIG. 3A. Then, by passing the video output through a low pass filter or the like, the peak envelope of the signal as represented by a curve (b) in FIG. 3B is obtained.

Figures 4A, 4B:
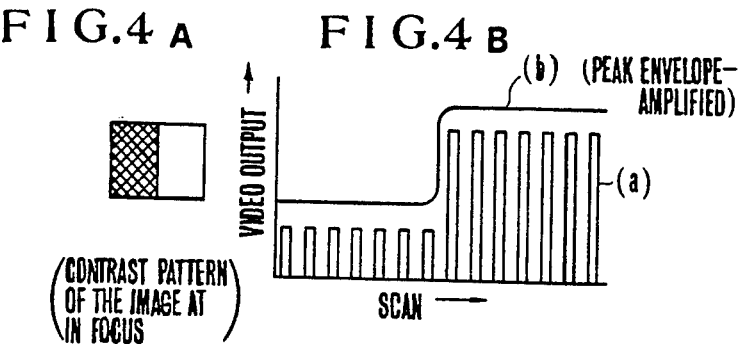
FIG. 4A illustrates the condition of an image formed on a screen when the lens is correctly focussed at the image forming system shown in FIG. 2.
FIG. 4B is a graph illustrating a video signal obtained by electrically scanning the image shown in FIG. 4A using, for example, the CCD shown in FIG. 1A.

On the other hand, when the pattern of the image 12 is as shown in FIG. 4A, the video output obtained from the photo-sensor array becomes as represented by a histogram (a) in FIG. 4. Then, also by passing the video output through a low pass filter or the like, the peak envelope of the signal as represented by a curve (b) in FIG. 4B is obtained. The peak envelope curves (b) shown in FIGS. 3B and 4B are obtained by amplifying the signals with an amplifier after they have passed through the low pass filter.

As apparent from comparison of FIGS. 3B and 4B, when the image 12 formed on the photo-sensor array is sharp, the video output (a) representing it suddenly changes at a boundary between light and dark pattern portions as in the case of FIG. 4B. Accordingly, if a peak envelop signal (b) of the video output (a) is differentiated through a differentiation circuit, the amplitude of the differentiation pulse reaches its maximum value when the image 12 is in a sharpest state. Then, the image 12 of the object 10 formed by the lens 11 on the screen 13 is in focus.

Figure 5B:
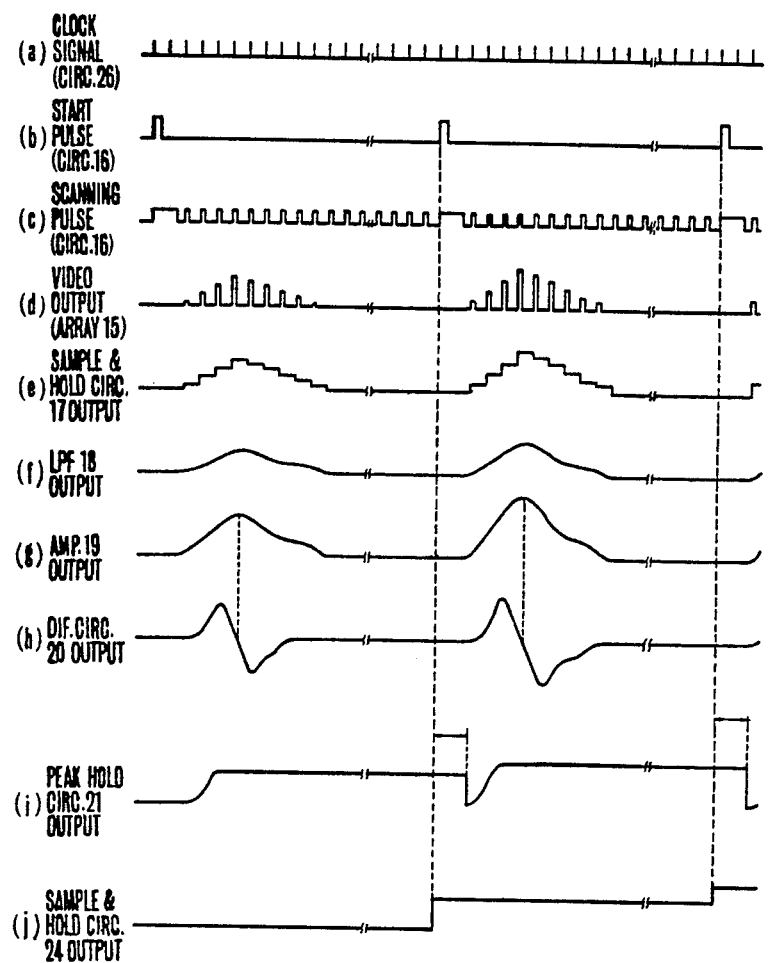
FIG. 5B is a wave form chart showing the wave form of the output signal of each circuit block obtained when the focus detecting device illustrated in FIG. 5A is in operation.

Now, referring to FIGS. 5A and 5B, an embodiment of the focus detecting device of the present invention which is based on the above stated operation principle is described as follows:

In FIG. 5A, a reference numeral 14 denotes an image forming lens which is adjustable along its optical axis O; 15 denotes a photo-sensor array, such as CCD or the like, which is disposed at a position to receive an image of an unillustrated object to be formed by the lens 14 and to be focused thereon; 16 denotes a driver circuit which is connected to the input terminal of the sensor array 15 and which produces start pulses (FIG. 5B(b)) and scanning pulses (FIG. 5B(c)) to drive the sensor array 15 by means of a clock signal (FIG. 5B(a)) supplied from the outside. A reference numeral 17 denotes a sample and hold circuit which is provided for making the video output of the photo-sensor array 15 into a signal (FIG. 5B(e)) of a 100% duty factor because the video output is a pulse-like signal (FIG. 5B(d) or FIG. 3B(a), or FIG. 4B(a)) of a 25-50% duty factor. The sample and hold circuit 17 converts the video output from the sensor array into a signal of a 100% duty factor and produces the converted signal as its output by taking in the output of each sensor element of the photo-sensor array 15, in response to the scanning pulse driving the photo-sensor array, and holding the output of each sensor element until the next scanning pulse is supplied. Further, in the case of a photo-sensor array which is made up of a combination of photo-diodes and CCD, the video output which is obtained from such a combination is already a signal of a 100% duty factor and, therefore, the sample and hold circuit 17 is dispensable.

A reference numeral 18 denotes a low pass filter which is provided for obtaining a peak envelope of the output of the sample and hold circuit 17 as shown in FIG. 5B(f); 19 denotes an amplifier for amplifying the output of the low pass filter 18; 20 denotes a differentiating circuit which is provided for the purpose of detecting the degree of image sharpness by differentiating the output (FIG. 5B(g)) of the amplifier circuit 19; and 21 denotes a peak hold circuit provided for holding the peak value of the output (FIG. 5B(h)) of the differentiating circuit 20 one after another, the peak value being held by a capacitor co disposed in the peak hold circuit 21. The low pass filter 18, amplifier 19, differentiating circuit 20 and peak hold circuit 21 are of known constructions, thereby they are shown in details in the drawings, and detaned description of them can be omitted here.

A reference numeral 22 denotes a switch which is provided with an analog gate for clearing the peak value (FIG. 5B(i)) being held by the peak hold circuit 21. The switch 22 is connected to the above stated peak holding capacitor co disposed in the peak hold circuit 21 and is turned on when a signal is applied to its control terminal C. Then, with the switch 22 turned on, the electric charge which is stored in the capacitor is instantaneously discharged to thereby clear the peak value held by the peak hold circuit 21. A reference numeral 23 denotes a shift register which is provided for adjustment of timing for turning the switch 22 on. The shift register 23 receives both the start pulse and the scanning pulses for driving the photo-sensor array 15 and produces a control signal for turning the switch 22 on, when a predetermined number of scanning pulses have been supplied after a start pulse is supplied, i.e. after a certain period of time τ following the generation of a start pulse (see FIG. 5B(i)). Then, in response to this control signal, the switch 22 is turned on and the peak hold circuit 21 is caused thereby to clear the peak value, which has been held therein, after a period of time τ delayed by the above stated shift register 23 following the generation of the start pulse (that is, at a point of time for commencement of new scanning).

A reference numeral 24 denotes a sample and hold circuit for sampling and holding the output of the above stated peak hold circuit 21. The sample and hold circuit 24 is set to take in the output of the peak hold circuit 21 and to hold it there until the next start pulse is supplied. Accordingly, at the time of commencement of each scanning process, the peak value which has been obtained through a preceding scanning process and which is retained in the peak hold circuit 21 before being cleared by the switch 22 is sampled and held in the sample and hold circuit 24. A reference numeral 25 denotes a meter connected to the output terminal of the sample and hold circuit 24 to indicate a focusing condition of the lens 14 to the object by the deflection of the pointer 25a of the meter 25.

A reference numeral 26 denotes an automatic scanning control circuit which is an essential part for the improvement of the present invention. The automatic scanning control circuit 26 detects the output of the low pass filter 18 and serves to change scanning recycle time duration if the output of any one of the photo-sensor elements of the photo-sensor array 15 comes to exceed a preset level which is set slightly lower than the saturation level of the photo-sensor elements. Then, by this, the effective light receiving time of each photo-sensor element in the photo-sensor array 15, i.e. the electric charge storing time which is described in the foregoing, is shortened to prevent the electric charge stored in the photo-sensor elements from becoming saturated, so that adequate video output can be always obtained. Further details of this function will be described in the description of other embodiment examples of this invention. Further, a reference numeral 26a denotes a reset terminal. When a reset signal is supplied through this reset terminal 26a, the automatic scanning control circuit 26 is reset into its original state.

With a focus detecting device arranged as described in the foregoing, and with the photo-sensor array 15 receiving an image of an object formed by the lens 14 as shown in the drawings, when clock signals of a preset frequency as represented by (a) in FIG. 5B is supplied from the automatic scanning control circuit 26 to the driver circuit 16, the driver circuit 16 produces start pulses and scanning pulses as represented by (b) and (c) in FIG. 5B respectively and supplys them to the photo-sensor array 15. Then, in response to each scanning pulse, the photo-sensor array 15 puts out one after another in time series the electric charge stored in each of the photo-sensor elements. The sample and hold circuit 17 then responds to each scanning pulse to take in the output of each photo-sensor element and holds it until the next scanning pulse is supplied. In this manner, the video output as represented by (d) in FIG. 5B is converted into a signal of a 100% duty factor as represented by (e) in FIG. 5B. The converted signal is then supplied to the low pass filter 18. Upon receipt of the signal from the sample and hold circuit 17, the low pass filter 18 obtains the peak envelope of the signal as shown in FIG. 5B(f). The peak envelope is amplified by the amplifier 19 as shown in FIG. 5B(g) and then supplied to the differentiating circuit 20 for detection of the sharpness of the image. The differentiating circuit 20 then produces an output signal which makes a sudden change from positive to negative at a point where the changing direction in the output of the amplifier 19 is reversed as shown in FIG. 5B(h); and the amplitude of the signal of the differentiating circuit 20 comes to correspond to the degree of the image sharpness. The peak value to the output signal of the differentiating circuit 20 is held at the capacitor co in the peak hold circuit 21. This, therefore, results in the output of the peak hold circuit 21 as shown in FIG. 5B(i). A first scanning process is completed as described in the foregoing. At the end of the scanning process, however, the hold value held in the peak hold circuit 21 has not yet been taken in by the sample and hold circuit 24. The output of the sample and hold circuit 24, therefore, is zero and the pointer 25a of the meter 25 points a zero point.

At the beginning of the next scanning process, when a start pulse is produced from the driver circuit 16, the sample and hold circuit 24 responds to this to take in the hold value of the previous scanning process and thereby the output of the sample and hold circuit 24 becomes as shown in FIG. 5B(j). In response to this output, the pointer 25a begins to deflect to eventually indicate the degree of the sharpness of the image on the photo-sensor array 15.

On the other hand, after the above stated start pulse is produced, the shift register 23 produces a control signal and supplies it to the switch 22 when a certain period of delay time τ has elapsed. Then, the switch 22 turns on in response to the control signal and thereby causes the capacitor co to discharge and clear the hold value of the above stated peak hold circuit 21 (see FIG. 5B(i)).

The video output of the photo-sensor array 15 is thus processed through each scanning. The degree of the sharpness of the image on the photo-sensor array 15 is indicated by the meter 25 each time scanning is accomplished. In repeating such scanning process, when the lens 14 which is in an out-of-focus position as shown by solid line in FIG. 5A is shifted in the direction of arrow A toward an in-focus position as shown by broken lines in FIG. 5A, the sharpness of the image is gradually improved. This in turn causes the video output of the photo-sensor array 15 to gradually increase. Then, the output of the sample and hold circuit 24 also gradually increases and the pointer 25a of the meter 25 comes to show a greater degree of deflection. Therefore, the sharpest image can be obtained on the photo-sensor array 15 by shifting the lens 14 along its optical axis O while watching the deflection of the meter 25 and by adjusting the lens 14 to a position where the pointer 25a of the meter 25 comes to deflect to a maximum degree. The lens 14 is then set in its in-forcus position.

The foregoing description covers the operation of the device under a normal condition. However, as already mentioned, in an electric charge storing type photo-sensor array, there is a limit to the amount of electric charge storable in each photo-sensor element constituting the photo-sensor array and such a limit or a saturation level of electric charge is predetermined. When such a saturation level is exceeded, an excess of electric charge of one photo-sensor element comes to flow out and mixes in another element to present a so-called blooming phenomenon, which as well known, makes it hardly possible to obtain an adequate video signal.

Therefore, also in the case of the above described focus detecting device, if the electric charge storing time of each photo-sensor element in fixedly set, the blooming phenomenon tends to occur making it impossible to perform accurate focus detection when the device is used for a bright object.

On the other hand, as already described in connection with FIG. 1A and FIG. 1B, the electric charge storing time of each photo-sensor element is dependent upon the scanning recycle time duration which corresponds to the start pulse generating cycle interval as shown in FIG. 5B(b). Meanwhile, the start pulse generating cycle is dependent on the frequency of the clock signals (FIG. 5B(a)) which is produced by an oscillator and which corresponds to scanning pulses as shown in FIG. 5B(c). Accordingly, the start pulse generating cycle can be adjusted by changing the frequency of the clock signals; or by changing the relation of the start pulses to the scanning pulses, i.e. by changing the count number of clock signals for determining the start pulse generating cycle. Then, through such change or adjustment, the electric charge storing time of these photo-sensor elements is adjustable.

Therefore, with the video output of the photo-sensor array detected, when the output of any one of the sensor elements is found exceeding a preset level (which is set to be slightly lower than the saturation level of the photo-sensor elements), the electric charge storing time of the photo-sensor elements can be automatically shortened to prevent generation of an erroneous signal either by increasing the frequency of the clock signals or by reducing the clock signal count number required for determining the start pulse generating cycle. Such function is performed by the automatic scanning control circuit 26 which is shown in FIG. 5A. Further details of this control circuit will be understood from the following description taken in connection with other drawings.

Figure 6A:
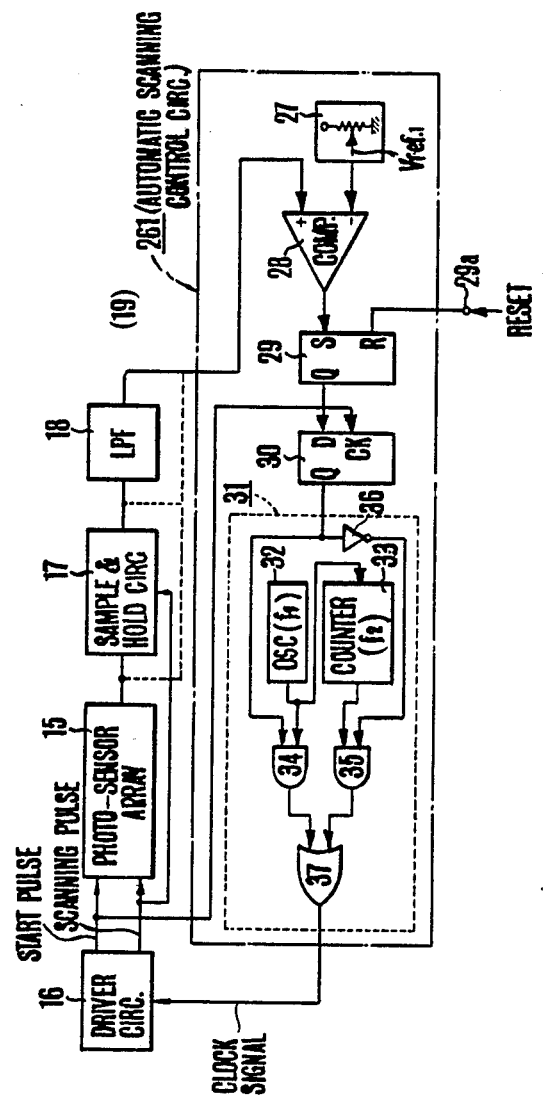
FIG. 6A is a circuit diagram illustrating a first example of the automatic scanning control circuit which is employed in the focus detecting device as an essential part for improvement to be effected in accordance with this invention.
Figure 6B:
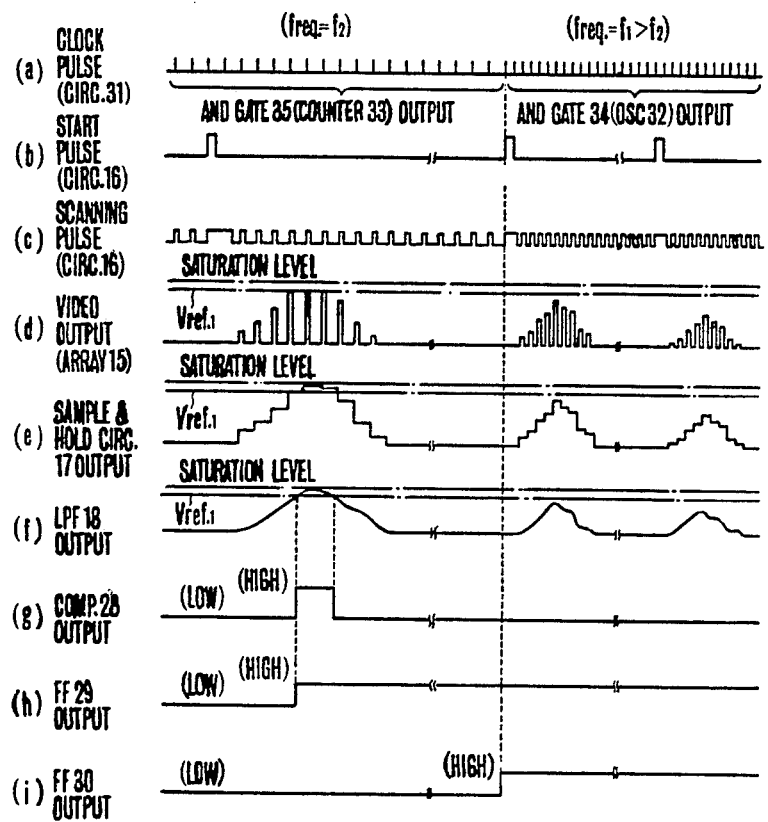
FIG. 6B is a wave form chart showing the wave form of the output signal produced from each circuit block in the focus detecting device and the automatic scanning control circuit shown in FIG. 6A when the focus detecting device is in operation.

FIGS. 6A and 6B illustrate a first embodiment example of this automatic scanning control circuit. In FIG. 6A, a reference numeral 261 denotes the automatic control circuit in its entirety; 27 denotes a reference voltage setting circuit whereby a reference voltage V-ref-1 which is slightly lower than the saturation level of each photo-sensor element is set; 28 denotes a comparator which compares the output of the low pass filter 18 with the reference voltage V-ref-1 set by the reference setting circuit 27, the comparator 28 being arranged to produce a "high" level signal as shown in FIG. 6B(g) when the output of the low pass filter 18 comes to exceed the reference voltage V-ref-1; 29 denotes a RS type flip-flop circuit which produces a "high" level signal from its output terminal Q as shown in FIG. 6B(h); and 29a denotes a reset terminal of the flip-flop circuit 29. A reference numeral 30 denotes a D type flip-flop circuit which, after the "high" level signal is supplied from the flip-flop circuit 29 thereto, produces a "high" level signal from its output terminal Q as shown in FIG. 6B(i) in synchronism with the start pluse (FIG. 6B(b)) produced from the driver circuit 16. A reference numeral 31 denotes a frequency selection circuit which comprises: an oscillator 32 which generates clock signals of a preset frequency f1, a counter or a frequency dividing circuit 33 which divides the clock signals generated by the oscillator 32 into a lower frequency f2; an AND gate 34 which receives the output from the terminal Q of the flip-flop circuit 30 and which puts out the clock signals from the oscillator 32 when the output of the terminal Q becomes "high"; an AND gate 35 which also receives the output of the flip-flop circuit 30 through an inverter 36 and, when the output of the inverter 36 is "high", that is, when the output Q of the flip-flop circuit 30 is "low", the AND gate 35 puts out the clock signals coming from the counter 33; and an OR gate 37 which supplies the outputs of these AND gates 34 and 35 to the driver circuit 16.

With the automatic control circuit arranged as described in the foregoing, when during the scanning process on the image, any of the outputs of photo-sensor elements in the photo-sensor array 15 does not exceed the reference voltage V-ref-1 set at the ref. voltage setting circuit 27, the output of the comparator 28 is "low". Therefore, the outputs Q (outputs from output terminals Q) of the flip-flop circuits 29 and 30 are also "low" and the AND gate 34 remains off. Then, the "high" output of the inverter 36 causes the AND gate to be turned on. This causes the AND gate 35 to puts out the output of the counter 33 which is clock signals of frequency f2; the clock signals of frequency f2 is supplied to the driver circuit 16; and scanning is performed at a relatively low speed which results in a longer start pulse generating cycle interval and in turn allows each photo-sensor element to have a long electric charge storing time.

Then, during the scanning process, when the output of the low pass filter 18 comes to exceed the reference voltage V-ref-1 as shown in FIG. 6B(f), the output of the comparator 28 becomes "high" as shown in FIG. 6B(g). In response to this, the output Q of the flip-flop circuit 29 becomes "high" as shown in FIG. 6B(h). Then, at the beginning of the next scanning process, the flip-flop circuit 30 which receives the "high" output of the flip-flop circuit 29 comes to produce a "high" output Q in response to the start pulse produced from the driver circuit 16 as shown in FIG. 6B(i). This makes the output of the inverter 36 "low" to turn off the AND gate 35 and, concurrently with this, to turn on the AND gate 34. Then, the OR gate 37 comes to put out the output of the oscillator 32, i.e. the clock signals of frequency f1 as shown in FIG. 6B(a). Then, as apparent from (c), (d) and (e) in FIG. 6B, the scanning speed increases and, accordingly, the start pulse generating cycle interval, i.e. the scanning recycle time duration becomes shorter to make the electric charge storing time of the photo-sensor elements shorter. Further, the shortening degree of the electric charge storing time directly corresponds to the change in the frequency of the clock signals. For example, the electric charge storing time is shortened to $\frac{1}{2}$ when the frequency is arranged to be $f1 = 2 \times f2$ and to $\frac{1}{4}$ when the frequency is arranged to be $f1 = 4 \times f2$.

With the automatic scanning control circuit 261 employed, therefore, when the focus detecting device is used for an unusally bright object, the frequency of the clock signals supplied to the driver circuit 16 becomes higher to shorten thereby the scanning recycle time duration, or the electric charge storing time of the photo-sensor elements, so that the electric charge stored in the sensor elements can be prevented from reaching a saturation level. Further, in order to shift the frequency of the clock signals from f1 back to f2, a "high" signal is supplied to the resetting terminal 29a of the flip-flop circuit 29. In cases where this focus detecting device is incorporated in a photographic camera or the like, such shifting of the flip-flop circuit 29 can be more advantageously accomplished through an interlocking arrangement with a shutter charging operation or the like. In addition to such, there is also a method wherein the frequency of the clock signals is automatically shifted back to the original frequency f2 when the brightness of an object becomes darker. An embodiment example of such an arrangement will be described in detail hereinafter.

Figure 7:
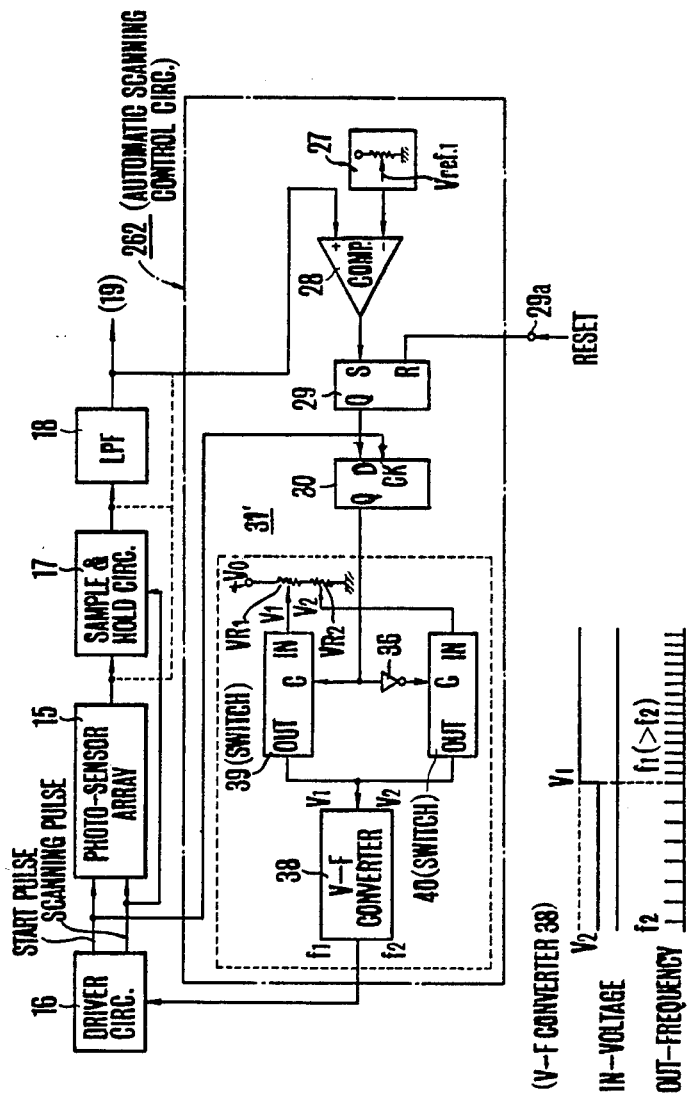
FIG. 7 is a circuit diagram illustrating a second example of the automatic scanning control circuit.

A second embodiment example of the automatic scanning control circuit of this invention uses a voltage-to-frequency converter (hereinafter will be called V-F converter) as illustrated in FIG. 7. Referring now to FIG. 7, a reference numeral 262 denotes the automatic scanning circuit in its entirety; while the same reference numerals as those used in FIG. 6A to indicate circuit elements are also used in this drawing to indicate like elements.

A reference numeral 31′ denotes a clock frequency selection circuit which comprises: A V-F converter 38 which generates clock signals of frequency corresponding to a supplied voltage; a switch 39 which receives an output Q of a flip-flop circuit 30 and, when the output Q becomes "high", turns on in response thereto to supply a voltage V1 set by a variable resister VR1 to the V-F converter 38 to cause the converter to generate clock signals of frequency f1; and a switch 40, which receives also the output Q of the flip-flop circuit 30 through an inverter 36, and which, when the output of the inverter 36 is "high", that is, when the output Q of the flip-flop circuit 30 is "low", turns on in response thereto. Then, with the switch 40 turned on, a voltage V2 which has been set by a variable resister VR2 is supplied to the V-F converter 38 to cause the converter 38 to generate clock signals of frequency f2 (V2 < V1 and therefore f2 < f1).

With arrangement as described above, if the output of the low pass filter 18 does not exceed the reference voltage V-ref-1 set at the reference voltage setting circuit 27, the output of the comparator 28 remains "low". Therefore, the outputs Q of the flip-flop circuits are "low". The switch 39 remains in an off condition while the switch 40 is turned on to supply the voltage V2 to the V-F converter 38. This causes the V-F converter 38 to supply the clock signals of frequency f2 to the driver circuit 16. Thus the electric charge storing time of the sensor elements in the photo-sensor array becomes relatively long in the same manner as in the preceding embodiment example.

If the output of the low pass filter comes to exceed the reference voltage V-ref-1 as represented by (f) in FIG. 6B, the output of the comparator becomes "high" as shown in FIG. 6B(g). In response to this, the output Q of the flip-flop circuit 29 becomes "high" as shown in FIG. 6B(h). Then, at the commencement of the next scanning process, the start pulse which is produced from the driver circuit 16 causes the output Q of the flip-flop circuit 30 which receives the "high" output of the flip-flop circuit 29 to become "high" as shown in FIG. 6B(i). By this, the switch 40 is turned off and the switch 39 is turned on to supply the voltage V1 to the V-F converter 38. Accordingly, the V-F converter comes to supply clock signals of frequency f1 to the driver circuit 16 to make the scanning speed higher than before in the same manner as in the preceding embodiment example (see FIGS. 6B(c), 6B(d) and 6B(e)). As a result of that, the start pulse generating cycle or scanning recycle time duration becomes f2/f1 as shown in FIG. 6B(b) and the electric charge storing time of photo-sensor elements becomes shorter accordingly.

Figure 8:
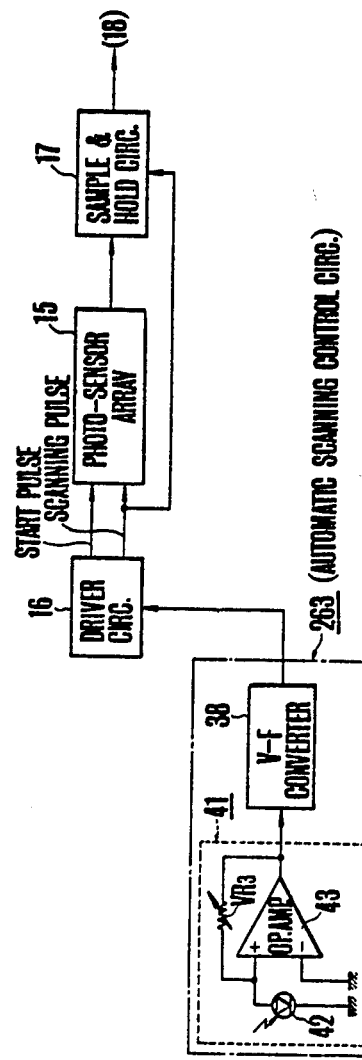
FIG. 8 is a circuit diagram illustrating a third example of the automatic scanning control circuit.

A third embodiment example of the automatic scanning control circuit of the present invention is as shown in FIG. 8 wherein: A reference numeral 263 denotes the automatic scanning control circuit in its entirety including a light measuring circuit 41 which comprises a light measuring photo-diode 42, an operational amplifier 43 and a variable resistor VR3 for sensitivity adjustments, and a V-F converter 38 which is similar to the one employed in the preceding embodiment. The frequency of clock signals produced from the V-F converter 38 is automatically adjustable according to an output voltage of the light measuring circuit 41.

Next, an example of an automatic resetting circuit which is applicable particularly to the automatic scanning control circuits 261 and 262 illustrated in FIGS. 6A and 7 for resetting such an automatic scanning control circuit automatically back into its original condition is described below with reference to FIGS. 9A and 9B.

Figure 9A:
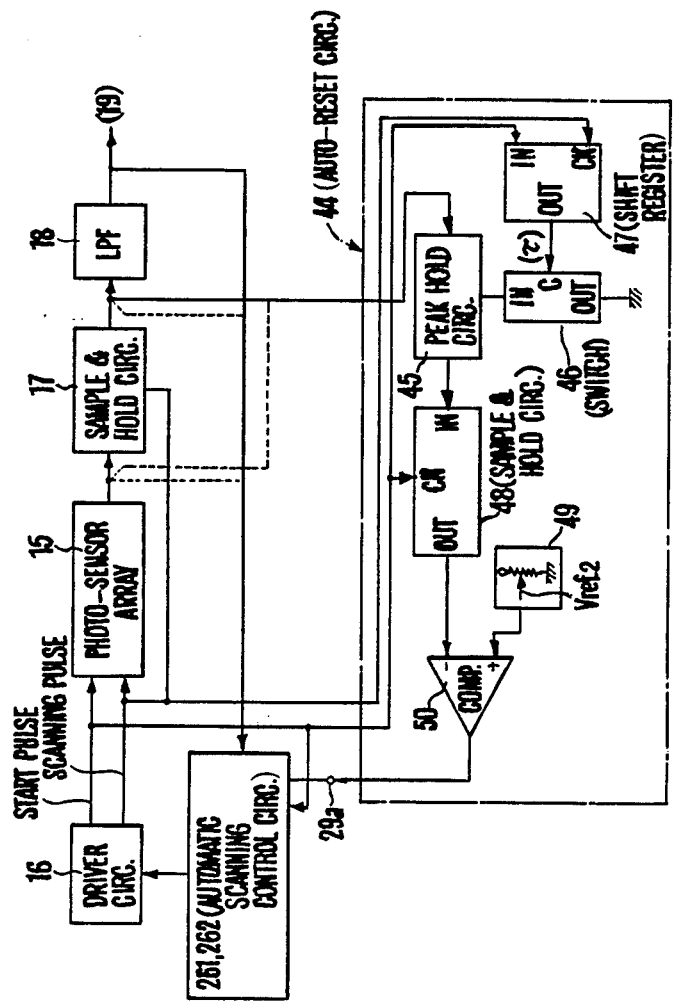
FIG. 9A is a circuit diagram illustrating an example of an automatic resetting circuit which is provided for automatically resetting the automatic scanning control circuit illustrated in FIGS. 6A or 7.

In FIG. 9A, a reference numeral 44 denotes the automatic resetting circuit in its entirety; and 45 denotes a peak hold circuit which holds the peak values of the output (FIG. 9B(e)) of the sample and hold circuit 17 one after another and is arranged in a manner similar to the peak hold circuit 21 shown in FIG. 5A. A reference numeral 46 denotes a switch provided for the purpose of clearing the peak value (FIG. 9B(f)) held by the peak hold circuit 45 in the same manner as in FIG. 5A. In other words, when a certain delay time τ1 (in case of freq.=f1) or τ2 (in case of freq.=f2) has elapsed after generation of a start pulse (FIG. 9B(b)), the switch 46 turns on in response to a control signal produced from a shift register 47 to clear the hold value held at the peak hold circuit 45. A reference numeral 48 denotes a sample and hold circuit which samples and holds the output of the peak hold hold circuit 45. In the same manner as the sample and hold circuit 24 shown in FIG. 5A, the sample and hold circuit 48 responds to a start pulse produced by the driver circuit 16 to take in the output of the peak hold circuit 45 and holds it until the next start pulse is supplied. A reference numeral 49 denotes a reference voltage setting circuit which set a reference voltage V-ref-2 for determining a level at which the frequency of the clock signals to be supplied to the driver circuit 16 is reset from f1 to f2 to bring the automatic scanning control circuit 261 or 262 back into its original condition; and a numeral 50 denotes a comparator which compares the output (FIG. 9B(g)) of the sample and hold circuit 48 with the reference voltage V-ref-2 set at the reference voltage setting circuit 49 and which is arranged to produce and supply a "high" level signal or a reset signal (FIG. 9B(h)) to a reset terminal 29a of a flip-flop circuit 29 in the automatic scanning control circuit 261 or 262 when the output of the sample and hold circuit 48 becomes lower than the reference voltage V-ref-2.

In such arrangement, if the hold value (FIG. 9B(f)) at the peak hold circuit 45 is higher than the reference voltage V-ref-2 when the frequency of the clock signals (FIG. 9B(a)) supplied from the automatic scanning control circuit 261 or 262 to the driver circuit 16 is f1 the output of the sample and hold circuit 48 (FIG. 9B(g)) is naturally higher than the reference voltage V-ref-2. Therefore, even if the sample and hold circuit 48 takes in the output of the peak hold circuit 45 and supplies it to the comparator 50 at the commencement of the next scanning process, the output of the comparator 50 (FIG. 9B(h)) becomes "low" and the automatic scanning control circuit 261 or 262 is not reset thereby. However, if the hold value at the peak hold circuit 45 becomes lower than the reference voltage V-ref-2 as shown in FIG. 9B(f), the output of the comparator 50 becomes "high" as shown in FIG. 9B(h), when the sample and hold circuit 48 takes in the output of the peak hold circuit 45, as shown in FIG. 9B(g), at the beginning of the next scanning process and puts it out to the comparator 50. Then, in the automatic scanning control circuit 261 or 262, the flip-flop circuit 29 is immediately reset and its output Q becomes "low" as shown in FIG. 9B(i). The flip-flop circuit 30 which receives the "low" level signal produces a "low" level signal from its output terminal Q in response to the start pulse applied at the beginning of the next scanning process. Then, in the case of the automatic scanning control circuit 261, the AND gate 34 is turned off and, concurrently with this, the AND gate 35 is turned on, and in the case of the automatic scanning control circuit 262, the switch 39 is then turned off and, concurrently with this, the switch 40 is turned on; and, through such, the frequency of the clock signals to be supplied to the driver circuit 16 is eventually shifted from f1 back to its original frequency f2.

Figure 10A:
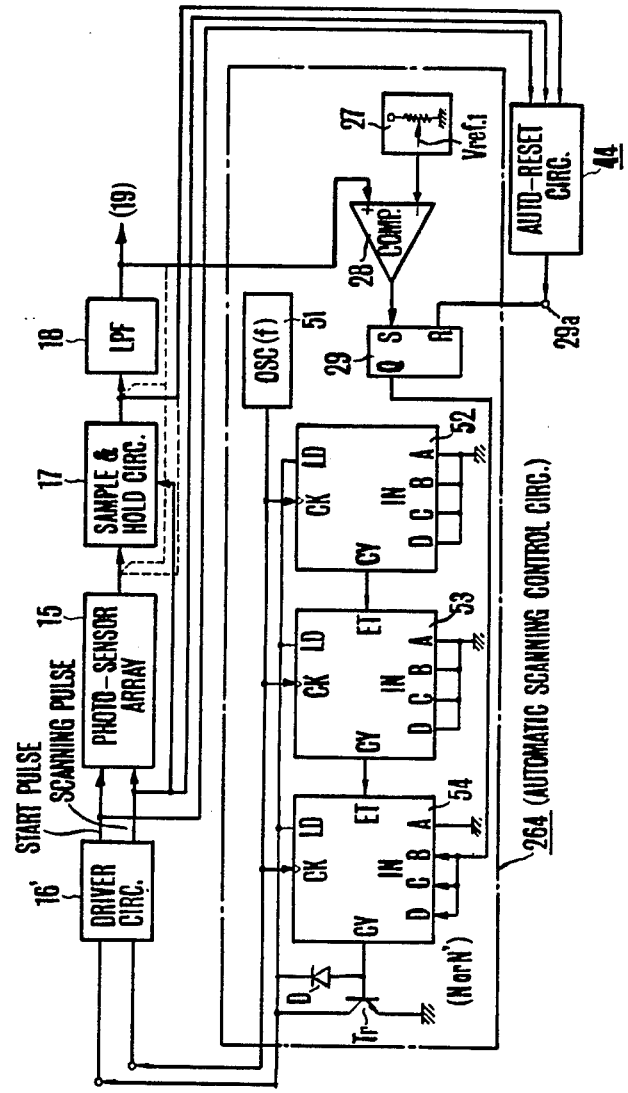
FIG. 10A is a circuit diagram illustrating a fourth example of the automatic scanning control circuit.

The foregoing description has covered the automatic scanning control circuit of this invention with examples wherein the start pulse generating time interval is changed by changing the frequency of clock signals to be supplied to the driver circuit 16. However, it is also possible, as mentioned in the foregoing, to change the start pulse generating time interval without changing the frequency of the clock signals. An example of such an arrangement is described hereunder as a fourth embodiment example with reference to FIGS. 10A and 10B:

In FIG. 10A, a reference numeral 264 denotes an automatic scanning control circuit in its entirety. In the drawing, the same reference numerals as used to indicate circuit elements in FIGS. 6A and 7 are used for indicating circuit elements which are identical with those shown in FIGS. 6A and 7. A reference numeral 51 denotes an oscillator which generates clock signals of frequency f as shown in FIG. 10B(a); and 52, 53 and 54 denote counters which are connected in three stages for producing reference clock pulses, as shown in FIG. 10B(f), which is used for defining start pulse generating timing, by dividing the frequency of the clock signals supplied from the oscillator 51. Of these counters, the counter 54 which is for counting a higher place is provided with four input terminals A, B, C and D. Of these terminals, the three control terminals B, C and D on the high place side are connected to the output terminal Q of the flip-flop circuit 29 and their count value is arranged to vary from N to N' (assuming that n<<N'<N, n being the total number of photo-sensor elements contained in the photo-sensor array 15) in response to a "high" output of the flip-flop circuit 29. In other words, they are set to vary the generating timing of the above stated reference clock pulses. A reference symbol D denotes a diode; Tr denotes a transistor; and a numeral 16' denotes a driver circuit for driving the photo-sensor array 15. In this particular example, the driver circuit 16' is arranged in such a manner that while it produces scanning pulses in response to the clock signals supplied from the oscillator 51, it produces start pulses (FIG. 10B(b)) according to the reference clock pulses applied from the counter 54.

In such arrangement, when the output (FIG. 10B(c)) from the low pass filter 18 does not exceed the reference voltage V-ref-1 which is set at the reference voltage setting circuit 27, the output (FIG. 10B(d)) of the comparator 28 is "low" and, accordingly, the output Q (FIG. 10B(e)) of the flip-flop circuit 29 is also "low". Therefore, a reference clock pulse (FIG. 10B(f)) is generated every time the count value of the clock signals (FIG. 10B(a)) supplied by the oscillator 51 becomes N. Then, the driver circuit 16' produces start pulses (FIG. 10B(b)) according to the reference clock pulses supplied from the counter 54 while it produces the scanning pulses according to the clock signals supplied from the oscillator 51. Therefore, the generating cycle interval of the start pulses is comparatively long and, accordingly, the electric charge storing time of photo-sensor elements also becomes long.

On the other hand, when the output of the low pass filter 18 exceeds the reference voltage V-ref-1 as shown in FIG. 10B(c), the output of the comparator 28 becomes "high" as shown in FIG. 10B(d). In response to this, the output Q of the flip-flop circuit 29 becomes "high" as shown in FIG. 10B(e). This causes the three control terminals B, C and D on the higher place side of the counter 54 to become "high" and the countable value of the counter is reduced from N to N'. Then, as understood from the FIG. 10B(a) and 10B(f), every time the count value of the clock signals supplied from the oscillator 51 becomes N', a reference clock pulse is produced from the counter 54. Accordingly, as shown in FIG. 10B(b), the start pulse generating cycle interval of the driver circuit 16' becomes N'/N while the frequency of the scanning pulses remains unchanged, and the electric charge storing time of the photo-sensor elements is shortened. Then, the electric charge storing time shortened to ½ if N'=½N and to ¼ if N'=¼N. In this manner, the shortening degree of the electric charge storing time directly corresponds to the ratio in which the total count value of the counters 52, 53 and 54 is changed. Further, the count values of the counters 52, 53 and 54 are adjustable as desired by selecting their input terminals to which the output Q of the flip-flop circuit 29 is to be supplied. Therefore, it will be advantageous to provide an arrangement for allowing manual selection of such input terminals from the outside.

Now, while scanning is performed under a condition in which the count value of the counters 52, 53 and 54 is shifted from N to N', when the output of the sample and hold circuit 48 in the automatic reset circuit 44 shown in FIG. 9A becomes lower than the reference voltage V-ref-2 set at the reference voltage setting circuit 49 as shown in FIG. 10B(g), the output of the comparator 50 becomes "high" as shown in FIG. 10B(h) in response thereto. Accordingly, the flip-flop circuit 29 is reset and its output Q becomes "low" as shown in FIG. 10B(e), so that the countable value of the counter 54 can be immediately shifted from N' back to its original value N.

In accordance with the automatic scanning control circuit 264 illustrated in FIG. 9A, the start pulse generating cycle interval, i.e. scanning recycle time duration, can be changed without changing the frequency of the clock signals and, accordingly, without changing the frequency of the scanning pulses as described in the foregoing.

A fifth embodiment example of the automatic scanning control circuit of this invention is described below with reference to FIG. 11.

In FIG. 11, a reference numeral 265 denotes an automatic scanning control circuit in its entirety, which represents a combination of the automatic scanning control circuit 261 shown in FIG. 6A and another automatic scanning control circuit 264 which is shown in FIG. 10A. In this example, the number of the scanning recycle time duration shifting steps is further divided into smaller steps. In FIG. 11, the same reference numerals as used in FIG. 6A and FIG. 10A for indicating circuit elements are also used for indicating circuit elements which are indentical with those of the drawings cited above. A reference numeral 28' denotes a comparator which is identical with the comparator 28 and is arranged to receive a reference voltage V-ref-1 at its (—) input terminal and to receive at its (+) input terminal the output of a low pass filter 18 through an analog gate 55 only when the output $\overline{Q}$ of the flip-flop circuit 30 is "high", that is, only when the frequency of the clock signals has been shifted from f2 to f1. A reference numeral 29' denotes a RS type flip-flop circuit which is identical with the flip-flop circuit 29 and its output terminal Q is connected to the higher place control terminals B, C and D of the counter 54. In this particular example, the counters 52, 53 and 54 count the clock signals supplied through the OR gate 37 and produce the above stated reference clock pulses. Further, the AND gate 35 which is provided for shifting clock signal frequency is arranged to receive the output Q of the flip-flop circuit 30. The rest of the arrangement is exactly the same as the preceding embodiments. Reference numerals 44 and 44' denote automatic reset circuit which are similar to the one shown in FIG. 9A. The first automatic reset circuit 44 is provided for resetting the flip-flop circuit 29, i.e. for shifting the frequency of the clock signals from f2 to f1. The second automatic reset circuit 44' is provided for resetting the flip-flop circuit 29', i.e. for shifting the countable value of the counters 52 through 54 from N' to N. The second automatic reset circuit 44' is so arranged that the output of the sample and hold circuit 17 is supplied to the second automatic resetting circuit 44' through an analog gate 56 only when the output of the first automatic resetting circuit 44 is "high".

As apparent from the foregoing, in this automatic scanning control circuit 265, if the output of the low pass filter 18 does not exceed the reference voltage V-ref-1, the driver circuit 16' is supplied with the clock signals of frequency f2 (see FIG. 6B(a)) and the reference clock pulses which is produced by the counter 54 at every N number of the clock signals (see FIG. 10B(f)). Accordingly, scanning recycle time duration becomes the longest. While scanning is repeated under such a condition, if the output of the low pass filter 18 comes to exceed the reference voltage V-ref-1 as shown in FIG. 6B(f), the frequency of the clock signals is shifted from f2 to f1 at the time when the next scanning process begins as shown in FIG. 6B(a) and, accordingly, the scanning recycle time duration becomes shorter. And then since the output Q of the flip-flop circuit 30 becomes "high", the analog gate 55 is turned on to cause the output of the low pass filter 18 to be supplied to the positive input side of the comparator 28'.

Therefore, while scanning is repeated under the condition where the frequency of the clock signals is f1 and the countable value of the counter 52 through 54 is N, if the output of the low pass filter 18 further comes to exceed the reference voltage V-ref-1, the countable value of the counter 52 through 54 is immediately shifted from N to N'; therefore the counter 54 produces the reference clock pulses at every N' number of the clock signals as shown in FIG. 10B(a) and 10B(f); and eventually the scanning recycle time duration becomes the shortest.

On the other hand, while scanning is repeated under the condition where the frequency of the clock signals is f1 and the countable value of the counters 52 through 54 is N', if the peak value of the output of the sample and hold circuit 17 becomes lower than the reference voltage V-ref-2 as shown in FIG. 9B(g), a "high" signal (a reset signal—FIG. 9B(h)) is supplied from the first automatic resetting circuit 44 to the reset terminal 29a of the flip-flop circuit 29 to reset the flip-flop circuit 29 (FIG. 9B(i)). Accordingly, while the countable value of the counters 52 through 54 remains to be N', the frequency of the clock signals comes to be shifted from f1 back to the original frequency f2 at the beginning of the next scanning.

Further, since the analog gate 56 turns on under such a condition, the output of the sample and hold circuit 17 comes to be supplied to the second automatic resetting circuit 44'.

Accordingly, while scanning is repeated under the condition where the frequency of the clock signals is f2 and the countable value of the counters 52 through 54 is N', if the peak value of the output of the sample and hold circuit 17 becomes to be more lower than the reference voltage V-ref-2 as shown in FIG. 10B(g), a "high" signal (a reset signal—FIG. 10B(h)) is supplied from the second automatic resetting circuit 44' to the reset terminal 29'a of the flip-flop circuit 29' to reset the flip-flop circuit 29' as shown in FIG. 10B(e). Accordingly, the countable value of the counters 52 through 54 is shifted from N' to the original value of N; and the automatic scanning control circuit 265 is reset back to its original condition wherein the frequency of the clock signals is f2 and the countable value of the counters 52 through 54 is N.

While scanning is repeated with the frequency of the clock signals being f1 and the countable value of the counters 52 through 54 being N, if a reset signal is produced from the automatic resetting circuit 44, the frequency of the clock signals comes to be again shifted from f1 back to f2.

It is possible to use only one auto-reset circuit and to simultaneously reset the flip-flop circuits 29 and 29' when the peak value of the output of the sample and hold circuit 17 becomes lower than the reference voltage V-ref-2 in such a way as to shift the frequency of the clock signals from f1 to f2 and the countable value of the counters 52 through 54 from N' to N. However, the arrangement to use two automatic resetting circuits, one for each of the flip-flop circuits 29 and 29' as shown in FIG. 11 is advantageous in the following respect:

In the embodiment example illustrated in FIG. 11, the combination of the automatic resetting circuits 44 and 44' for the automatic scanning control circuit 265 permits to have four different modes including (a) clock signal frequency is f2, and countable value of counters 52 through 54 is N (b) clock signal frequency is f1, and countable value of counters 52 through 54 is N (c) clock signal frequency is f2, and countable value of counters 52 through 54 is N'

(d) clock signal frequency is f1, and countable value of counters 52 through 54 is N'.

Therefore, assuming the $f1=2f2$ and $N'=\frac{1}{2}N$, and that the scanning recycle time duration in the mode (a) is T, the scanning recycle time duration in other modes (b)-(d) are obtained as follows: For the mode (b), $f2/f1 T = \frac{1}{2}T$; for mode (c), $N+/NT = \frac{1}{2}T$; and for mode (d), $f2/f1 \cdot N'/NT = \frac{1}{4}T$. Thus, in accordance with this embodiment example, 4 different scanning recycle time durations are obtainable to permit finer adjustment of the electric charge storing time.

Figure 12A:
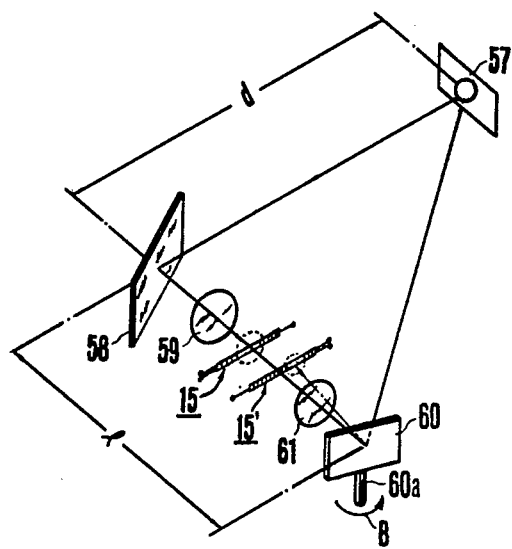
FIG. 12A is a schematic illustration of another embodiment example of this invention as applied to a so-called range finder type focus detecting device and particularly the basic arrangement of the optical system thereof.
Figure 12B:
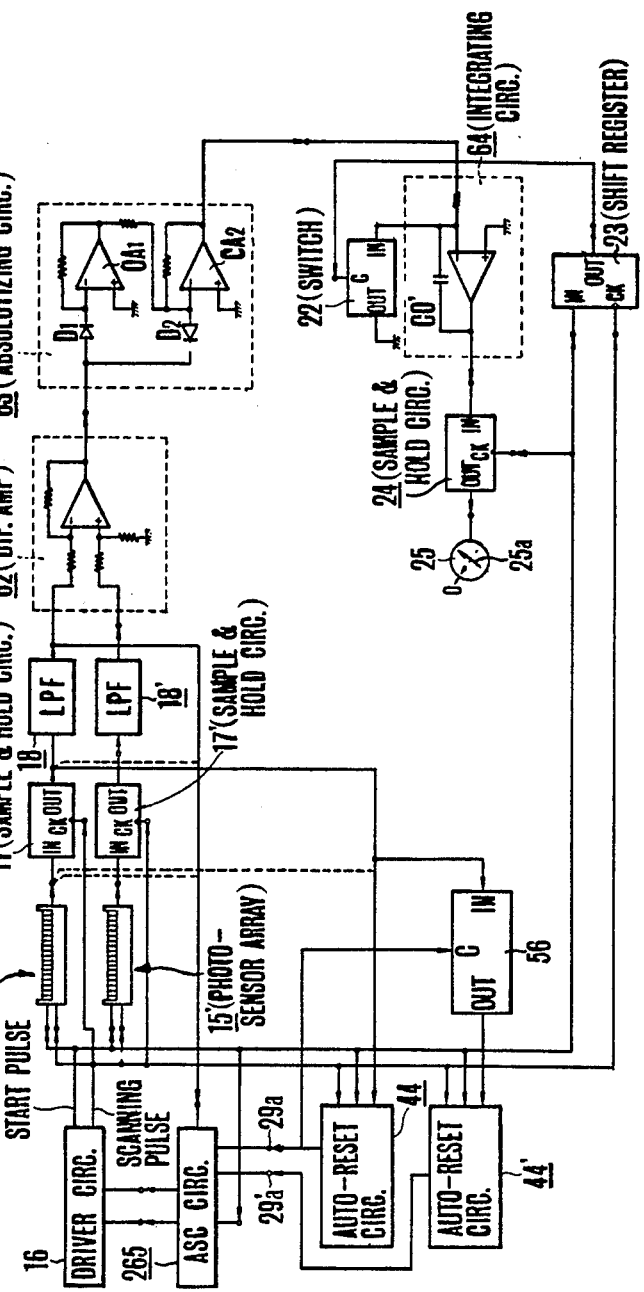
FIG. 12B is a circuit diagram illustrating the electrical circuit arrangement of the range finder type focus detecting device shown in FIG. 12A.

In the last place, FIGS. 12A-12C illustrate another embodiment of the focus detecting device of this invention. In this embodiment, the device is arranged to be of a range finer type as described below:

In FIG. 12A which illustrates the optical system arrangement of the focus detecting device, a reference numeral 57 denotes an object on which focus is to be made; 58 denotes a reflecting mirror which is stationarily disposed at an angle of about 45 degrees to reflect the light of the object at about a right angle; 59 denotes a first image forming lens which is stationarily disposed to receive the light deflected by the mirror 58 to form an image of the object on a predetermined image forming plane; 60 denotes a movable reflecting mirror which is disposed at a predetermined base length l away from the stationary mirror 58 to be rotatable on its shaft 60a; and 61 denotes a second image forming lens which receives light from the movable reflecting mirror 60 to form an image of the object 57 on a predetermined image forming plane and which is stationarily disposed to have its optical axis coincide with that of the first lens 59. In the rear of the first lens 59, there is fixedly disposed a first photo-sensor array 15 with its light receiving surface arranged to coincide with the image forming plane of the first lens 59 and with the center of its light receiving surface arranged to coincide with the optical axis of the lens 59. Then, a second photo-sensor array 15' which is of the same construction as the first photo-sensor array 15 is disposed in the rear of the second lens 61 with its light receiving surface and the center of the light receiving surface arranged to coincide respectively with the image forming plane and optical axis of the second lens 61. These two sensor arrays 15 and 15' are fixedly disposed back to back with each other.

In this arrangement with the movable mirror 60 set aslant at an angle of about 45 degrees symmetrically with the fixed mirror 58, when a sighting system consisting of the mirror 58, the first lens 59 and the first photo-sensor array is aligned to the object 57, an image of the object 57 formed by the first lens 59 is located about the central part of the light receiving surface of the first photo-sensor array 15 as shown in FIG. 12A. On the other hand, in a detecting system consisting of the movable mirror 60, the second lens 61 and the second photo-sensor array 15', an image of the object 57 formed by the second lens 61 is located on the light receiving surface of the second photo-sensor array 15' at a position with relative positional deviation with respect to the position of the image on the light receiving surface of the first photo-sensor array 15, corresponding to distance d to the object 57.

Under such a condition, when the video outputs of the first and second photo-sensor arrays 15 and 15' obtained by driving them in synchronism are compared with each other, the video output of the second photo-sensor array 15' comes to deviate in its phase to a degree correspondence to the distance d to the object 57 with respect to the phase of the video output of the first photo-sensor array 15.

Therefore, the distance d to the object 57 can be found by obtaining the degree of phase difference between the video outputs of the first and second photo-sensor arrays 15 and 15'.

In another method of detecting the distance d to the object 57, the video output of the second photo-sensor array 15' is compared with the video output of the first photo-sensor array 15; and the movable mirror 60 is rotated from its about 45 degree slanting position around its shaft 60a in the direction of the arrow B shown in the drawing until the video outputs of the two photo-sensor arrays 15 and 15' come to coincide with each other; then the distance d to the object 57 can be obtained from the rotating amount of the mirror 60.

In such a case, an image forming optical system which is shiftable along its optical axis is arranged in an operative relation to the above stated movable mirror 61 in such a manner that the optical system is correctly focused to the object 57 when the video outputs of these photo-sensor arrays 15 and 15' come to coincide with each other. In this manner, the focusing condition of the optical system can be readily detected by comparing the two video outputs.

Referring now to FIGS. 12B and 12C, an example of electrical circuit arrangement which is suitable for use in combination with the optical system shown in FIG. 12A is described below:

In FIG. 12B, the circuit elements that are indicated by the same reference numerals as in FIGS. 5A and 11 are identical with those shown in the preceding embodiments. Therefore, detailed description of these elements is omitted here.

A reference numeral 17' denotes a second sample and hold circuit which is provided for converting the video output of the second photo-sensor array 15' into a signal of 100% duty factor. The second sample and hold circuit 17' is identical with the first sample and hold circuit 17. A reference numeral 18' denotes a second low pass filter which is provided for the purpose of obtaining a peak envelope of the output of the second sample and hold circuit 17' (FIG. 12C(c)) and is identical with the first low pass filter 18. Numeral 62 denotes a differential amplifier provided for obtaining difference between the outputs of the first and second low pass filter 18 and 18' (FIG. 12C(d); and 63 denotes an absolutizing circuit provided for converting the output of the differential amplifier 62 into an absolute value (FIG. 12C(e). As shown in the drawing, the absolutizing circuit 63 comprises in combination a circuit portion which includes a first diode D1 and a first operational amplifier OA1 and operates in response to a positive input signal and another circuit portion which includes a second diode D2 and a second operational amplifier OA2, and operates in response to a negative input signal. The absolutizing circuit 63 produces a positive signal irrespective as to whether the output of the differential amplifier 62 is positive or negative. A reference numeral 64 denotes an integrating circuit which is provided for integrating the output of the absolutizing circuit 63. Its integrating value is held by the capacitor co' provided in therein until the switch 22 is turned on, i.e. until a delay time $\tau$ set by the shift register 23 elapses after a start pulse is generated as mentioned in the foregoing (see FIG. 12C(f)).

The sample and hold circuit 24 is arranged to take in, in response to the start pulse, the integrated value of the integrating circuit 64 from the capacitor co' before it is cleared and to supply the integrated value to the meter 25.

In this embodiment, an automatic scanning control circuit which is identical with the one shown in FIG. 11 is employed without any modification.

With the arrangement described in the foregoing being set in a condition as shown in FIG. 12A wherein the position of an image on the second photo-sensor array 15' is deviating with respect to the position of an image on the first photo-sensor array 15 to a degree corresponding to distance d to the object 57, when the start pulses (FIG. 12C(a)) and the scanning pulses are supplied from the driver circuit 16' to the first and second photo-sensor arrays 15 and 15' to simultaneously drive them, the output of the second photo-sensor array 15' has a phase difference from the video output of the first photo-sensor array 15 to a degree corresponding to the above stated relative deviation in the image forming positions. Accordingly, when the peak envelopes of these outputs are obtained through low pass filter 18 and 18' after they have been sampled and held by the sample and hold circuits 17 and 17', the phase of the output of the low pass filter 18' differs by $\Delta 1$ from that of the output of the low pass filter 18 as understood from FIGS. 12C(b) and 12C(c). The difference between the outputs of the low pass filters 18 and 18' is obtained through the differential amplifier 62 as shown in FIG. 12C(d). When the difference obtained through the amplifier 62 is converted into an absolute value through the absolutizing circuit 63, the result is as shown in FIG. 12C(e). Therefore, while scanning is being carried out, when the outputs of the absolutizing circuit 63 is integrated one after another by the integrating circuit 64, the integrated value thus obtained becomes as shown in FIG. 12C(f). Then, at the beginning of next scanning, this is taken in by the sample and hold circuit 24 in synchronism with a start pulse. Accordingly, the pointer 25a of the meter 25 comes to show a great deflection as shown by a full line in FIG. 12B. This indicates that an unillustrated optical system is out of focus.

Therefore, while watching the meter 25, when the optical system is shifted alongs its optical axis in such a way as to rotate the mirror 60 in the direction of arrow B shown in FIG. 12A, this causes the relative deviation of the image positions on the two photo-sensor arrays 15 and 15' to gradually decrease. Accordingly, the phase difference between the outputs of the low pass filters 18 and 18' also comes to decrease to $\Delta 2 (<\Delta 1)$, as shown in FIG. 12C(b) and 12C(c). Then, the output of the integrating circuit 64 which is taken in by the sample and hold circuit 24 also gradually decreases and the pointer 25a of the meter 25 comes to deflect to a lesser degree. Then, while the mirror 60 is rotating, when the relative positions of images on the photo-sensor arrays 15 and 15' comes to coincide with each other, the phase difference $\Delta$ between the outputs of the low pass filters 18 and 18' becomes zero as shown in FIGS. 12C(b) and 12C(c). Accordingly, when the next start pulse is generated, the signal to be taken in by the sample and hold circuit 24 becomes zero and the pointer 25a of the meter 25 comes to a zero point as shown by a broken line in FIG. 12B thus to indicate that the optical system has reached an in-focus position. The optical system, therefore, can be correctly focused to the object 57 by shifting the optical system along its optical axis while watching the meter 25 till the pointer 25a comes to indicate a zero point.

Now, while the scanning process is repeated, if the output of the low pass filter 18 comes to exceed the reference voltage V-ref-1 which is set at the automatic scanning control circuit 265, the control circuit 265 works firstly to shift the frequency of clock signals to be supplied to the driver circuit 16' from f2 to f1; and scanning recycle time duration is shortened to f2/f1.

And further, despite of such shifting, if the output of the low pass filter 18 still exceeds the reference voltage V-ref-1, the generating cycle interval of the reference clock pulses to be supplied to the driver circuit 16' is shortened from f1·N to f1·N' and the scanning recycle time duration is further shortened to N'/N.

Where the scanning recycle time duration is f2/f1·N'/N, if the peak value of the output of the sample and hold circuit 17 becomes lower than the reference voltage V-ref-2 which is set at the first automatic reset circuit 44, the first automatic resetting circuit 44 causes the frequency of the clock signals to be supplied to the driver circuit 16' to shift from f1 to the original frequency f2. If, despite of such shifting, the peak value of the output of the sample and hold circuit 17 still becomes lower than the reference voltage V-ref-2, the second automatic resetting circuit 44 comes to work and the generating cycle interval of the reference clock pulses to be supplied to the driver circuit 16' is shifted from f2·N' to the original cycle interval f2·N.

Of course, under the condition with the frequency of the clock signals having been shifted from f2 to f1, if the peak value of the output of the sample and hold circuit 17 becomes lower than the reference voltage V-ref-a, the first automatic resetting circuit works to bring the frequency from f1 back to the original frequency f2.

The electric charge storing time of the photo-sensor elements in the photo-sensor arrays 15 and 15' is thus automatically adjusted.

In all of the embodiments of this invention described in the foregoing, the CCD (charge coupled device) as shown in FIG. 1A or the BBD (bucket brigade device) that operates in about the same manner as the CCD is employed as photo-sensor array. Then, for the sake of reference, the foregoing description is supplemented with the following description of another embodiment wherein a photo-diode array which operates in an electric charge storing mode is employed as photo-sensor array instead of the CCD or BBD:

As mentioned in connection with the description of FIGS. 1A and 1B in case the photo-diode array which operate in an electric charge storing mode, the scanning pulses supplied from the driver circuit is used as shift pulses of a shift register. The shift register is shifted step by step with each scanning pulse to operate each analog switch connected to each photo-diode in such a way as to take out, in time series, an electric signal which corresponds to the electric charge to be stored at each photo-diode. However, the operating mode of the photo-diode array somewhat differs from the CCD or BBD as described below:

When one of the analog switches is caused to turn on by the shifting operation of the shift register that takes place in response to a scanning pulse, an electric charge current flows from an electric charging circuit to a photo-diode which is connected to the analog switch to charge the photo-diode to a full extent, or until the capacity of the photo-diode comes to be saturated with the charge. Then, when this analog switch is turned off by shifting operation of the shift register, an amount of electric charge in the photo-diode corresponding to an integrated amount of light incident on the photo-diode (an intensity of light × length of incident time) is discharged, so that the electric charge stored in the photo-diode is decreased corresponding to the integrated amount of the incident light. Then, in next scanning, when this analog switch is again turned on, again the charge current flows from the charging circuit to the photo-diode to replenish it with an amount of electric charge corresponding to the amount decreased according to the integrated amount of the incident light. Therefore, the amount of the charging current then comes to correspond to the integrated amount of the light incident upon this photo-diode, and this charging current becomes a video signal.

In other words, in the case of the photo-diode array, the electric charge in each photo-diode is first discharged when light is applied thereto; and, when each of the photo-diodes is recharged, the charging current flowing to the diode is obtained as video signal. In this case, however, the capacity of each photo-diode is of course predetermined. Therefore, the photo-diode array must be used within a range of the integrated light amount determined in relation to such capacity.

For example, when the integrated amount of light incident upon a specific photo-diode comes to exceed a level of such an integrated light amount determined in relation to the capacity of the photo-diode, the whole electric charge with which the photo-diode has been fully charged to its capacity or its saturation level is discharged thereby. However, there never takes place any further discharge because the diode is depleted. Therefore, the electric current which flows to the photo-diode for next charging corresponds to the capacity of the photo-diode and does not correspond to the integrated amount of the light incident upon the photo-diode, so that a correct video signal can not be obtained from such arrangement.

Therefore, in the case of the photo-diode array also, the scanning recycle time duration (which is to be regarded as electric charge discharging time of each photo-diode element in the case of a photo-diode array) must be adjusted to the brightness of an object. Whereas, in accordance with this invention, the provision of the automatic scanning control circuit which is described in the foregoing as a main point of this invention makes it possible to obtain exactly the same advantageous effect as in the preceding examples of embodiments of this invention even when it is used in combination with such a photo-diode array of the type operating in an electric charge storing mode.

As described in detail in the foregoing, in accordance with this invention, in carrying out focus detection with one or more photo-sensor arrays which are of an electric charge storing type or which operate in an electric charge storing mode, the scanning recycle time duration of the array or arrays can be automatically adjusted in accordance with the brightness of an object. In accordance with this invention, generation of erroneous signals can be prevented even in cases of an unusually bright object wherein an erroneous signal tends to be produced as the integrated amount of light incident upon each photo-sensor element comes to exceed an allowable integrated light amount determined according to the capacity of the photo-sensor element; and, in cases of a dark object, a S/N ratio can be prevented from becoming excessively poor due to extreme attenuation of an output signal of the photo-sensor element. Thus, adequate video outputs can be always obtained irrespective of variation in the brightness of the object, so that very accurate focus detection can be accomplished for any object. It is particularly advantageous to use photo-sensor array or photo-sensor arrays which are of an electric charge storing type or which operate in an electric charge storing mode.

Now, with the exception of the embodiment illustrated in FIG. 8, in all other examples of the automatic scanning control circuit, the control is performed by detecting the output of the low pass filter 18. However, as conceptionally shown with broken lines in the drawings, such control also may be of course performed either by detecting the output of the sample and hold circuit 17 or by directly detecting the output of the photo-sensor array 15.

In the same way, the automatic reset circuit may also be operated by directly detecting the output of the photo-sensor array 15, instead of detecting the output of the sample and hold circuit 17, as conceptionally shown with broken lines in the accompanying drawings.

In the case of the example of the automatic scanning control circuit shown in FIGS. 6A and 7, the frequency of the clock signals to be supplied to the driver circuit 16 is shifted between f2 and f1 while, in the case of the example of automatic scanning control circuit shown in FIG. 10A, the countable value at the counters 52 through 54 is arranged to be shiftable between N and N', however, such shifting arrangements may easily be modified from the circuits of the examples to perform such shifting between a greater number of shifting steps.

What is claimed is:

1. A focus detecting device for detecting the focusing of an image forming optical system on an object, said optical system having an optical axis and being adjustable along the axis so as to form an image of the object on a predetermined focusing plane, said device comprising:
   (A) photo-sensor array means having a plurality of electric charge storing type photo-sensor elements, said array means being disposed at a position substantially corresponding to said focusing plane;
   (B) driver circuit means for electrically driving said photo-sensor array means, said driver circuit means being electrically coupled to the array means to provide the array means with intermittent start pulses at cyclical intervals and intermittent scanning pulses and for causing the array means to produce, one after another in time series, outputs of electric charge stored in each photo-sensor element during a period of time corresponding to the cyclical interval of said start pulses; the electric charge being stored in each photo-sensor element corresponding to the brightness of the portion of the image appearing at the photo-sensor element within said period of time;
   (C) signal processing circuit means for processing the output signal of said photo-sensor array means, said processing circuit means being electrically coupled to the array means to provide an electrical output representative of the focusing condition of the optical system relative to the object, on the basis of said output signals of the array means;
   (D) control circuit means for adjusting the scanning recycle time duration in correspondence to the brightness of the object, said control circuit being electrically coupled to said driver circuit means to accomplish the adjustment of the scanning recycle time duration by adjusting the cyclical interval of said start pulses to be applied to said array means in correspondence to the brightness of the object; and
   (E) said control circuit means including means for detecting the brightness of at least a portion of the image appearing at the photo-sensor array means within a period of time, means for establishing a range of reference values and control means for adjusting the scanning recycle time duration in response to said detecting means detecting that the instantaneous brightness of at least a portion of the image appearing at the photo-sensor array means deviates from the predetermined range of reference values.

2. A device according to claim 1, wherein said control circuit means comprises:
   first electrical circuit means electrically coupled to said driver circuit means for providing the driver circuit means with intermittent base clock pulses, said driver means being arranged to generate said scanning pulses and said start pulses on the basis of said base clock pulses supplied from the first circuit means; and
   second electric circuit means electrically coupled to said first circuit means to control the cyclical interval of said base clock pulses to be supplied from said first circuit means to said driver circuit means in accordance with the brightness of the object,
   the cyclical interval of the start pulses to be generated by said driver circuit means thus being adjustable in correspondence with the brightness of the object by adjusting the cyclical interval of the base clock pulses to be supplied to said driver circuit in correspondence with the object brightness.

3. A device according to claim 2, wherein
   (a) said first electrical circuit means includes:
      a base clock pulse generating circuit which is capable of generating at least first intermittent base clock pulses having a first cyclical interval and second intermittent base clock pulses having a second cylcical interval longer than the cyclical interval of the first base clock pulses; and
      a selection circuit for selectively supplying at least said first base clock pulses or said second base clock pulses to said driver circuit means, said selection circuit being electrically coupled to said base clock pulse generating circuit and to said driver circuit means; and wherein
   (b) said second electrical circuit includes:
      a control circuit for controlling said selection circuit in correspondance with the brightness of the object, said control circuit being electrically coupled to said selection circuit to control the selection circuit in correspondence with the object brightness for selection of the base clock pulses to be supplied to said driver circuit means.

4. A device according to claim 3, wherein said control circuit includes:
   comparator means for comparing the level of the output signal of said photo-sensor array means or a signal level which is substantially equivalent thereto with the level of a predetermined reference signal, said comparator means producing a predetermined output signal when the level of said signal exceeds the level of said reference signal, and wherein
   said selection circuit is electrically coupled to said comparator means to change the base clock pulses to be supplied to said driver circuit means from said second base clock pulses to said first base clock pulses in response to the output signal of said comparator means.

5. A device according to claim 4, wherein said base clock pulse generating circuit includes:
   oscillator means for providing said first intermittent base clock pulses; and
   frequency dividing means for providing said second intermittent base clock pulses by frequency dividing said first base clock pulses, the frequency dividing means being electrically coupled to said oscillator means, and wherein
   said selection circuit is electrically coupled to both of said oscillator means and said frequency dividing means to change the base clock pulses to be supplied to said driver circuit means from the second base clock pulses provided by the frequency dividing means to the first base clock pulses provided by said oscillator means in response to the output signal of said comparator means.

6. A device according to claim 4, wherein said comparator means is electrically coupled to a part of said signal processing circuit means to compare the level of a signal which is substantially equivalent to the output signal of said photo-sensor array means with the level of said reference signal.

7. A device according to claim 4, wherein said comparator means is electrically coupled to said photo-sensor array means to compare the level of the output signal of the array means with the level of said reference signal.

8. A device according to claim 3, wherein said control circuit includes:

first comparator means for comparing the level of the output signal of said photo-sensor array means or that of a signal substantially equivalent thereto with the level of a first predetermined reference signal, the first comparator means producing a first predetermined output signal when the level of the output signal of the photo-sensor array means exceeds the level of the first reference signal; and second comparator means for comparing the peak value of the output signal of said photo-sensor array means or the peak value of a signal substantially equivalent thereto with the level of a second predetermined reference signal having a lower level than said first reference signal, the second comparator means producing a second predetermined output signal when the peak value of said output signal of the photo-sensor array means falls below the level of said second reference signal, and wherein said selection circuit is electrically coupled to said first and second comparator means to change the base clock pulses to be supplied to said driver circuit means from said second base clock pulses to the first base clock pulses in response to said first output signal of the first comparator means and to change the base clock pulses from the first base clock pulses to the second base clock pulses in response to said second output signal of the second comparator means.

9. A device according to claim 2, wherein said second electrical circuit means includes:

a comparator circuit for comparing the level of the output signal of said photo-sensor array means or that of a signal substantially equivalent thereto with the level of a predetermined reference signal, the comparator circuit producing a predetermined output signal when the level of the output signal exceeds the level of said reference signal; and selection circuit for changing the generating cycle interval of the base clock pulses to be supplied from said first electrical circuit means to said driver circuit means between at least a first cyclical interval and a second cyclical interval which is longer than the first cyclical interval, said selection circuit being electrically coupled to said first electrical circuit means and to said comparator circuit to change the cyclical interval of the base clock pulses to be generated by the first circuit means from the second cyclical interval in response to the output signal of said comparator circuit.

10. A device according to claim 9, wherein said first electrical circuit means includes:

a base clock pulse generating circuit which generates base clock pulses at intervals in accordance with input voltage; and wherein said selection circuit is electrically coupled to said base clock pulse generating circuit to change the input voltage to the base clock pulse generating circuit from a second voltage value required for obtaining said second cyclical interval to a first voltage value required for obtaining said first cyclical interval in response to the output signal of said comparator circuit.

11. A device according to claim 10, wherein said selection circuit includes:

first voltage setting means for setting said first voltage value;

second voltage setting means for setting said second voltage value; and selecting means for selectively supplying the voltages with said first or second voltage value to said base clock pulse generating circuit, said selecting means being electrically coupled to said generating circuit, to said comparator circuit and to said first and second voltage setting means to change the voltage to be supplied to said base clock pulse generating circuit from the second voltage value to the first voltage value.

12. A device according to claim 9, wherein said comparator means is electrically coupled to said signal processing circuit means and is arranged to compare the level of a signal which is of a level substantially equivalent to that of the output signal of said photo-sensor array means with the level of said reference signal.

13. A device according to claim 9, wherein said comparator circuit means is electrically coupled to said photo-sensor array means to compare the level of the output signal of said array means with that of said reference signal.

14. A device according to claim 12, wherein said second electrical circuit means includes:

a first comparator circuit for comparing the level of the output signal of said photo-sensor array means or that of a signal substantially equivalent thereto with the level of a first predetermined reference signal, the first comparator circuit producing a first predetermined output signal when the level of the output signal exceeds the level of the first reference signal;

a second comparator circuit for comparing the peak value of the output signal of said photo-sensor array means or the peak value of a signal substantially equivalent thereto with the level of a second predetermined reference signal which is of a lower level than said first reference signal, the second comparator circuit producing a second predetermined output signal when the peak value of said output signal becomes lower than the level of said second reference signal; and a selection circuit for changing the cyclical interval of the base clock pulses to be supplied from said first electrical circuit means to said driver circuit means between at least a first cyclical interval and a second cyclical interval which is longer than the first cyclical interval, said selection circuit being electrically coupled to said first electrical circuit means and to said first and second comparator circuits to change the cyclical interval of the base clock pulses generated by the first circuit means from the second cyclical interval to the first cyclical interval in response to the first output signal of the first comparator circuit and also to change the cyclical interval of the base clock pulses from the first cyclical interval to the second cyclical interval in response to the second output signal of said second comparator circuit.

15. A device according to claim 2, wherein said first electrical circuit means includes:

a base clock pulse generating circuit which generates base clock pulses at cyclic intervals in accordance with input voltage thereto; and wherein said second electrical circuit means is electrically coupled to said pulse generating circuit to adjust the input voltage to said generating circuit to correspond to the brightness of the object.

16. A device according to claim 15, wherein said second electrical circuit means includes:
a brightness measuring circuit for measuring the object brightness, said measuring circuit being electrically coupled to said base clock pulse generating circuit to supply the generating circuit with a voltage corresponding to the brightness of the object.

17. A device according to claim 1, wherein said control circuit means comprises:
first electrical circuit means electrically coupled to said driver circuit means for providing the driver circuit means with first intermittent base clock pulses and causing said driver circuit means to generate said scanning pulses on the basis of said first clock pulses supplied from the first electrical circuit means;
second electrical circuit means electrically coupled to said driver circuit means for providing said driver circuit means with second intermittent base clock pulses having a cyclical interval longer than that of said first base clock pulses, said driver circuit means generating said start pulses on the basis of said second clock pulses supplied from said second circuit means; and
third electrical circuit means for controlling the cyclical interval of said second clock pulses to be supplied from said second circuit means to said first circuit means in correspondence with the object brightness, said third electrical circuit means being electrically coupled to said second circuit means.

18. A device according to claim 17, wherein said second electrical circuit means is electrically coupled to said first electrical circuit means to produce said second clock pulses by frequency dividing said first clock pulses; and wherein said third electrical circuit means includes:
an adjustment circuit electrically coupled to said second circuit means for adjusting the value of frequency division performed by said second electrical circuit means to correspond to the brightness of the object.

19. A device according to claim 18, wherein said adjustment circuit includes:
comparator means for comparing the level of the output signal of said photo-sensor array means or a signal of a level substantially equivalent thereto with the level of a predetermined reference signal, said comparator means producing a predetermined output signal when the level of said output signal of the photo-sensor array means or a signal of a level substantially equivalent thereto exceeds the level of the reference signal; and
selection means for changing the frequency dividing value of said second electrical circuit means at least between N and N' which is smaller than N, said selection means being electrically coupled to said second circuit means and to said comparator means to change the frequency dividing value of the second electrical circuit means at least from N to N' in response to the output signal of said comparator means.

20. A device according to claim 19, wherein said comparator means is electrically coupled to a part of said signal processing circuit means to compare a signal of a level which is substantially equivalent to the output signal of said photo-sensor array means with the level of said reference signal.

21. A device according to claim 19, wherein said comparator means is electrically coupled to said photo-sensor array means to compare the level of the output signal of the array means with the level of said reference signal.

22. A device according to claim 18, wherein said adjustment circuit includes:
first comparator means for comparing the level of the output of said photo-sensor array means or that of a signal substantially equivalent thereto with the level of a first predetermined reference signal and for producing a first predetermined output signal when the level of the output signal of the photo-sensor array means exceeds that of said first reference signal:
second commparator means for comparing the peak value of the output of said photo-sensor array means or that of a signal substantially equivalent thereto with a second predetermined reference signal which is of a level lower than the first reference signal and for producing a second predetermined output signal when the peak value of said output signal of the photo-sensor array means drops lower than the level of said second predetermined reference signal; and
a selection means for changing the frequency dividing value of said second electrical circuit means between N and N' which is smaller than N, said selection means being electrically coupled to said second circuit means and to said first and second comparator means to change the frequency dividing value of said second electrical circuit means from N to N' in response to the first output signal of said first output signal of said first comparator means and to change the frequency dividing value from N' to N in response to the second output signal of said second comparator means.

23. A device according to claim 17, wherein said second electrical circuit means is electrically coupled to said first electrical circuit means to produce said second clock pulses by frequency dividing said first clock pulses; and wherein said control circuit means further comprises:
fourth electrical circuit means for controlling the cyclic intervals at which said first clock pulses are generated in correspondence to the object brightness, said fourth electrical circuit means being electrically coupled to said first electrical circuit means.

24. A device according to claim 23, wherein said control circuit means further comprises:
fifth electrical circuit means for controlling the operation of said third and fourth electrical circuit means, said fifth electrical circuit means being electrically coupled to said third and forth electrical circuit means to actuate at least one of the third and the fourth circuit means for corresponding to the brightness of the object.

25. An image sharpness detecting device for detecting the sharpness of an image of an object formed by an image forming optical system on a predetermined imaging plane comprising:
(A) photo-sensor array means having a plurality of electric charge storing type photo-sensor elements at a position substantially corresponding to said imaging plane;

(B) driver circuit means for electrically driving said photo-sensor array means, said driver circuit means being electrically coupled to the array means to provide the array means with intermittent start pulses occurring at a cyclical interval and intermittent scanning pulses, and for driving the array means to cause it to produce, one after another in time series, outputs of electric charge stored in each photo-sensor element during a period of time corresponding to the cyclical interval of said start pulses, said electric charge being stored in each photo-sensor element in correspondence with the brightness of each portion in the image corresponding to the photo-sensor element within said period of time;

(C) detecting circuit means electrically coupled to said photo-sensor array means to detect the sharpness of the image formed by said optical system on said imaging plane and for producing an electrical output representative of the sharpness of the image formed by the optical system by processing the output signal of the array means;

(D) control circuit means for controlling the electric charge storing time of photo-sensor elements in said array means to correspond to the brightness of the object, said control circuit means being electrically coupled to said driver circuit means to control the electric charge storing time of said photo-sensor elements by adjusting the cyclical interval of the start pulses supplied from the driver circuit means to the photo-sensor array means in correspondence with the object brightness; and (E) said control circuit means including means for detecting the brightness of at least a portion of the image appearing at the photo-sensor array means within a period of time, means for establishing a range of reference values and control means for adjusting the scanning recycle time duration in response to said detecting means detecting that the instantaneous brightness of at least a portion of the image appearing at the photo-sensor array means deviates from the predetermined range of reference values.

26. A device according to claim 25, wherein said control circuit means comprises:
first electrical circuit means electrically coupled to said driver circuit means for providing the driver circuit means with intermittent base clock pulses and for generating said scanning pulses and said start pulses on the basis of said base clock pulses supplied from the first circuit means; and
second electric circuit means electrically coupled to said first circuit means to control the cyclical interval of said base clock pulses to be supplied from said first circuit means to said driver circuit means in accordance with the brightness of the object,
so that the cyclical interval of the start pulses generated by said driver circuit means are adjusted in correspondence to the brightness of the object by adjusting the generating cycle interval of the base clock pulses to be supplied to said driver circuit means in correspondence with the object brightness.

27. A device according to claim 26, wherein
(a) said first electrical circuit means includes:
a base clock pulse generating circuit capable of generating at least first intermittent base clock pulses having a first cyclical interval and second intermittent base clock pulses having a second cyclical interval longer than the cyclical interval of the first base clock pulses; and
a selection circuit for selectively supplying at least said first base clock pulses or said second base clock pulses to said driver circuit means, said selection circuit being electrically coupled to said base clock pulse generating circuit and to said driver circuit means; and wherein
(b) said second electrical circuit means includes:
a control circuit for controlling said selection circuit in correspondence with the brightness of the object, said control circuit being electrically coupled to said selection circuit to control the selection circuit in correspondence with the object brightness for selection of the base clock pulses to be supplied to said driver circuit means.

28. A device according to claim 27, wherein said control circuit includes:
comparator means for comparing the level of the output signal of said photo-sensor array means or a signal level which is substantially equivalent thereto with the level of a predetermined reference signal and for producing a predetermined output signal when the level of said output signal of the photo-sensor array means exceeds the level of said reference signal, and wherein
said selection circuit is electrically coupled to said comparator means to change the base clock pulses to be supplied to said driver circuit means from said second base clock pulses to said first base clock pulses in response to the output signal of said comparator means.

29. A device according to claim 26, wherein said second electrical circuit means includes:
a comparator circuit which compares the level of the output signal of said photo-sensor array means or that of a signal substantially equivalent thereto with the level of a predetermined reference signal and for producing a predetermined output signal when the level of the output signal of the photo-sensor array means exceeds the level of said reference signal, and
a selection circuit for changing the cyclical interval of the base clock pulses to be supplied from said first electrical circuit means to said driver circuit means between at least a first cyclical interval and a second cyclical interval which is longer than the first cyclical interval, said selection circuit being electrically coupled to said first electrical circuit means and to said comparator circuit to change the cyclical interval of the base clock pulses to be generated by the first circuit means from the second cyclical interval to the first cyclical interval in response to the output signal of said comparator circuit.

30. A device according to claim 29, wherein said first electrical circuit means includes:
a base clock pulse generating circuit which generates base clock pulses at intervals in accordance with input voltage; and wherein
said selection circuit is electrically coupled to said base clock pulse generating circuit to change the input voltage to the base clock pulse generating circuit from a second voltage value required for obtaining said second cyclical interval to a first voltage value required for obtaining said first cyclical interval in response to the output signal of said comparator circuit.

31. A device according to claim 25, wherein said control circuit means comprises:

first electrical circuit means electrically coupled to said driver circuit means for providing the driver circuit means with first intermittent base clock pulses; said driver circuit means generating said scanning pulses on the basis of said first clock pulses from the first electrical circuit means;

second electrical circuit means electrically coupled to said driver circuit means for providing said driver circuit means with second intermittent base clock pulses having a cyclical interval longer than that of said first base clock pulses, said driver circuit means generating said start pulses based on said second clock pulses from said second circuit means; and third electrical circuit means for controlling the cyclical interval of said second clock pulses from said second circuit means to said first circuit means in correspondence with the object brightness, said third electrical circuit means being electrically coupled to said second circuit means.

32. A device according to claim 31, wherein said second electrical circuit means is electrically coupled to said first electrical circuit means to produce said second clock pulses by frequency dividing said first clock pulses; and wherein said control circuit means further comprises:

fourth electrical circuit means for controlling the cyclic intervals at which said first clock pulses are generated in correspondence with the object brightness, said fourth electrical circuit means being electrically coupled to said first electrical circuit means.

33. A device according to claim 32, wherein said control circuit means further comprises:

fifth electrical circuit means for controlling the operation of said third and fourth electrical circuit means, said fifth electrical circuit means being electrically coupled to said third and fourth electrical circuit means to actuate at least one of the third and fourth circuit means in correspondence with the brightness of the object.

34. A range finding device for detecting the distance between the device and an object, comprising:

(A) a range finding optical system forming two images of said object with relative positional differences corresponding to the distance to the object;

(B) photo-sensor array means arranged to receive said two images formed by said range finding optical system and to provide electrical signals representative of the relative position of one of said two images with respect to the position of the other image; said array means having a plurality of electric charge storing type photo-sensor elements;

(C) driver circuit means for electrically driving said photo-sensor array means, said driver circuit means being electrically coupled to the array means to provide the array means with intermittent start pulses and intermittent scanning pulses to cause the array means to produce, one after another in time series, the outputs of electric charge stored in each photo-sensor element during a period of time corresponding to the cyclical interval of said start pulses, said electric charge being stored in each photo-sensor element in correspondence to the brightness of each picture portion in the image corresponding to the photo-sensor element within said period of time;

(D) detecting circuit means electrically coupled to said photo-sensor array means so as to detect distance to the object and produce an electrical output representative of the distance between the range finding device and the object by processing said electrical signals of the array means;

(E) control circuit means for controlling the electric charge storing time of said photo-sensor elements in said array means in correspondence to the brightness of the object, said control circuit means being electrically coupled to said driver circuit means to control the electric charge storing time of said photo-sensor elements by adjusting the cyclical interval of the start pulses supplied from the driver circuit means to the photo-sensor array means in correspondence with the object brightness; and (F) said control circuit means including detecting means for detecting the brightness of at least a portion of the image appearing at the photo-sensor array means within a period of time, means for establishing a range of reference values and control means for adjusting the scanning recycle time duration in response to said detecting means detecting that the instantaneous brightness of at least a portion of the image appearing at the photo-sensor array means deviates from the predetermined range of reference values.

35. A device according to claim 34, wherein said control circuit means comprises:

first electrical circuit means electrically coupled to said driver circuit means for providing the driver circuit means with intermittent base clock pulses, said driver circuit means generating said scanning pulses and said start pulses on the basis of said base clock pulses from the first circuit means; and second electrical circuit means electrically coupled to said first circuit means to control the cyclical interval of said base clock pulses from said first circuit means to said driver circuit means in accordance with the brightness of the object, the cyclical interval of the start pulses to be generated by said driver circuit means thus being adjusted in correspondence with the brightness of the object by adjusting the cyclical interval of the base clock pulses to said driver circuit means in correspondence with the object brightness.

36. A device according to claim 35, wherein (a) said first electrical circuit means includes:

a base clock pulse generating circuit which is capable of generating at least first intermittent base clock pulses having a first cyclical interval and second intermittent base clock pulses having a second cyclical interval longer than the cyclical interval of the first base clock pulses; and a selection circuit for selectively supplying at least said first base clock pulses or said second base clock pulses to said driver circuit means, said selection circuit being electrically coupled to said base clock pulse generating circuit and to said driver circuit means; and wherein (b) said second electrical circuit means includes:

a control circuit for controlling said selection circuit in correspondence with the brightness of the object, said control circuit being electrically coupled to said selection circuit to control the selection circuit in correspondence with the object brightness for selection of the base clock pulses to said driver circuit means.

37. A device according to claim 36, wherein said control circuit includes:
   comparator means for comparing the level of the output signal of said photo-sensor array means or a signal level which is substantially equivalent thereto with the level of a predetermined reference signal and for producing a predetermined output signal when the level of said output signal of the photo-sensor array means exceeds the level of said reference signal, and wherein
   said selection circuit is electrically coupled to said comparator means to change the base clock pulses to said driver circuit means from said second base clock pulses to said first base clock pulses in response to the output signal of said comparator means.

38. A device according to claim 37, wherein said base clock generating circuit includes:
   oscillator means for providing said first intermittent base clock pulses; and
   frequency dividing means for providing said second intermittent base clock pulses by frequency dividing said first base clock pulses, the frequency dividing means being electrically coupled to said oscillator means, and wherein
   said selection circuit is electrically coupled to both the oscillator means and the frequency dividing means to change the base clock pulses to said driver circuit means from the second base clock pulses provided by the frequency dividing means to the first base clock pulses provided by said oscillator means in response to the output signal of said comparator means.

39. A device according to claim 36, wherein said control circuit includes:
   first comparator means for comparing the level of the output signal of said photo-sensor array means or that of a signal substantially equivalent thereto with the level of a first predetermined reference signal, the first comparator means producing a first predetermined output signal when the level of the output signal of the photo-sensor array means exceeds the level of the first reference signal; and
   second comparator means for comparing the peak value of the output signal of said photo-sensor array means or the peak value of a signal substantially equivalent thereto with the level of a second predetermined reference signal which is of a lower level than said first reference signal and for producing a second predetermined output signal when the peak value of said output signal of the photo-sensor array means is lower than the level of said second reference signal, and wherein
   said selection circuit is electrically coupled to said first and second comparator means to change the base clock pulses to said driver circuit means from the second base clock pulses to the first base clock pulses in response to said first output signal of the first comparator means and to change the base clock pulses from the first base clock pulses to the second base clock pulses in response to said second output signal of the second comparator means.

40. A device according to claim 35, wherein said second electrical circuit means includes:
   a comparator circuit for comparing the level of the output signal of said photo-sensor array means or that of a signal substantially equivalent thereto with the level of a predetermined reference signal, the comparator circuit producing a predetermined output signal when the level of the output signal of the photo-sensor array means exceeds the level of said reference signal; and
   a selection circuit for changing the cyclical interval of the base clock pulses to be supplied from said first electrical circuit means to said driver circuit means between at least a first cyclical interval and a second cyclical interval which is longer than the first cyclical interval, said selection circuit being electrically coupled to said first electrical circuit means and to said comparator circuit to change the cyclical interval of the base clock pulses generated by the first circuit means from the second cyclical interval to the first cyclical interval in response to the output signal of said comparator circuit.

41. A device according to claim 40, wherein said first electrical circuit means includes:
   a base clock pulse generating circuit which generates base clock pulses at cyclical intervals in accordance with input voltage; and wherein
   said selection circuit is electrically coupled to said base clock pulse generating circuit to change the input voltage to the base clock pulse generating circuit from a second voltage value required for obtaining said second cyclical interval to a first voltage value required for obtaining said first cyclical interval in response to the output signal of said comparator circuit.

42. A device according to claim 35, wherein said second electrical circuit means includes:
   a first comparator circuit for comparing the level of the output signal of said photo-sensor array means or that of a signal substantially equivalent thereto with the level of a first predetermined reference signal and for producing a first predetermined output signal when the level of the output signal of the photo-sensor array means exceeds the level of the first reference signal;
   a second comparator circuit for comparing the peak value of the output signal of said photo-sensor array means or the peak vaue of a signal substantially equivalent thereto with the level of a second predetermined reference signal which is of a lower level than said first reference signal and for producing a second predetermined output signal when the peak value of said output signal of the photo-sensor array means falls below the level of said second reference signal; and
   a selection circuit for changing the cyclical interval of the base clock pulses from said first electrical circuit means to said driver circuit means between at least a first cyclical interval and a second cyclical interval longer than the first cyclical interval, said selection circuit being electrically coupled to said first electrical circuit means and to said first and second comparator circuits to change the cyclical interval of the base clock pulses generated by the first circuit means from the second cyclical interval to the first cyclical interval in response to the first output signal of the first comparator circuit and also to change the cyclical interval to the second cyclical interval in response to the second output signal of said second comparator circuit.

43. A device according to claim 35, wherein said first electrical circuit means includes:

a base clock pulse generating circuit which generates base clock pulses at cyclic intervals in accordance with input voltage thereto; and wherein said second electrical circuit means is electrically coupled to said pulse generating circuit to adjust the input voltage to said generating circuit in correspondence with the brightness of the object.

44. A device according to claim 34, wherein said control circuit means comprises:

first electrical circuit means electrically coupled to said driver circuit means for providing the driver circuit means with first intermittent base clock pulses; said driver circuit means being arranged for generating said scanning pulses on the basis of said first clock pulses supplied from the first electrical circuit means;

second electrical circuit means electrically coupled to said driver circuit means for providing said driver circuit means with second intermittent base clock pulses having a cyclic interval longer than that of said first base clock pulses, said driver circuit means generating said start pulses based on said second clock pulses supplied from said second circuit means; and third electrical circuit means for controlling the cyclic interval of said second clock pulses to be supplied from said second circuit means to said first circuit means in correspondence with the object brightness, said third electrical circuit means being electrically coupled to said second circuit means.

45. A device according to claim 44, wherein said second electrical circuit means is electrically coupled to said first electrical circuit means to produce said second clock pulses by frequency dividing said first clock pulses; and wherein said third electrical circuit means includes:

an adjustment circuit which adjust the value of frequency division made by said second electrical circuit means in correspondence with the brightness of the object, the adjustment circuit being electrically coupled to said second circuit means.

46. A device according to claim 45, wherein said adjustment circuit includes:

comparator means for comparing the level of the output signal of said photo-sensor array means or a signal of a level substantially equivalent thereto with the level of a predetermined reference signal and for producing a predetermined output signal when the level of said output signal of the photo-sensor array means exceeds the level of the reference signal; and selection means for changing the frequency dividing value of said second electrical circuit means at least between N and N' which is smaller than N, said selection means being electrically coupled to said second circuit means and to said comparator means to change the frequency dividing value of the second electrical circuit means at least from N to N' in response to the output signal of said comparator means.

47. A device according to claim 46, wherein said adjustment circuit includes:

first comparator means for comparing the level of the output of said photo-sensor array means or that of a signal substantially equivalent thereto with the level of a first predetermined reference signal and for producing a first predetermined output signal when the level of the output signal of the photo-sensor array means exceeds that of said first reference signal;

second comparator means for comparing the peak value of the output of said photo-sensor array means or that of a signal substantially equivalent thereto with a second predetermined reference signal which is of a level lower than the first reference signal and for producing a second predetermined output signal when the peak value of said output signal of the photo-sensor array means drops below the level of said second predetermined reference signal; and selection means for changing the frequency dividing value of said second electrical circuit means between N and N' which is smaller than N, said selection means being electrically coupled to said second circuit means and to said first and second comparator means to change the frequency dividing value of said second electrical circuit means from N to N' in response to the first output signal of said first comparator means and to change the frequency dividing value from N' to N in response to the second output signal of said second comparator means.

48. A device according to claim 44, wherein said second electrical circuit means is electrically coupled to said first electrical circuit means to produce said second clock pulses by frequency dividing said first clock pulses; and wherein said control circuit means further comprises:

fourth electrical circuit means for controlling the cyclic intervals at which said first clock pulses are generated in correspondence with the object brightness, said fourth electrical circuit means being electrically coupled to said first electrical circuit means.

49. A device according to claim 48, wherein said control circuit means further comprises:

fifth electrical circuit means for controlling the operation of said third and fourth electrical circuit means, said fifth electrical circuit means being electrically coupled to said third and fourth electrical circuit means to actuate at least one of the third and fourth circuit means in correspondence with the brightness of the object.

50. A focus detecting device for detecting the focusing condition of an image forming lens system relative to an object, said lens system having an optical axis and being adjustable along the axis, said device comprising:

(A) a range finding optical system operatively associated with said image forming lens system for forming two images of the object with relative positional differences which correspond to a degree of deviation of set positions of the lens system from a position at which the lens system is properly focused on the object;

(B) photo-sensor array means arranged relative to said range finding optical system to provide electrical signals representative of the relative position of one of said two images with respect to the position of the other image, said array means having a plurality of electric charge storing type photo-sensor elements;

(C) driver circuit means for electrically driving said photo-sensor array means, said driver circuit means being electrically coupled to the array means to provide the array means with intermittent start pulses and intermittent scanning pulses and for driving the array means to cause it to produce, one after another in time series, outputs of the electric charge stored in each photo-sensor element during a period of time corresponding to the cyclic interval of said start pulses, said electric charge being stored in each photo-sensor element in correspondence with the brightness of a portion of the image corresponding to the photo-sensor element within said period of time;

(D) signal processing circuit means for processing the electric signals of said photo-sensor array means, said signal processing circuit means being electrically coupled to the array means to produce an electrical output representative of the focusing of said image forming lens system to the object, on the basis of said electrical signals of the array means;

(E) control circuit means for adjusting scanning recycle time duration in correspondence with the brightness of the object, said control circuit being electrically coupled to said driver circuit means to adjust the scanning recycle time duration by adjusting the cyclic interval of said start pulses applied to said array means in correspondence with the brightness of the object; and (F) said control circuit means including detecting means for detecting the brightness of at least a portion of the image appearing at the photo-sensor array means within a period of time, means for establishing a range of reference values and control means for adjusting the scanning recycle time duration in response to said detecting means detecting that the instantaneous brightness of at least a portion of the image appearing at the photo-sensor array means deviates from the predetermined range of reference values.

51. A device according to claim 50, wherein said control circuit means comprises:

first electrical circuit means electrically coupled to said driver circuit means for providing the driver circuit means with intermittent base clock pulses and for generating said scanning pulses and said start pulses on the basis of said base clock pulses supplied from the first circuit means; and second electric circuit means electrically coupled to said first circuit means to control the cyclic interval of said base clock pulses to be supplied from said first circuit means to said driver circuit means in accordance with the brightness of the object, the cyclic interval of the start pulses benerated by said driver circuit means being adjusted to correspond to the brightness of the object when the cyclic interval of the base clock pulses to said driver circuit means is adjusted to correspond to the object brightness.

52. A device according to claim 51, wherein (a) said first electrical circuit means includes:

a base clock pulse generating circuit which is capable of generating at least first intermittent base clock pulses having a first cyclic interval and second intermittent base clock pulses having a second cyclic interval longer than the cyclic interval of the first base clock pulses; and a selection circuit for selectively supplying at least first base clock pulses or said second base clock pulses to said driver circuit means, said selection circuit being electrically coupled to said base clock pulse generating circuit and to said driver circuit means, and wherein (b) said second electrical circuit means includes:

a control circuit for controlling said selection circuit in correspondence with the brightness of the object, said control circuit being electrically coupled to said selection circuit to control the selection circuit in correspondence with the brightness of the object for selection of the base clock pulses supplied to said driver circuit means.

53. A device according to claim 52, wherein said control circuit includes:

comparator means for comparing the level of the output signal of said photo-sensor array means or a signal level which is substantially equivalent thereto with the level of a predetermined reference signal and for producing a predetermined output signal when the level of said output signal of the photo-sensor array means exceeds the level of said reference signal, and wherein said selection circuit is electrically coupled to said comparator means to change the base clock pulses to said driver circuit menas from said second base clock pulses to said first base clock pulses in response to the output signal of said comparator means.

54. A device according to claim 51, wherein said second electrical circuit means includes:

a comparator circuit for comparing the level of the output signal of said photo-sensor array means or that of a signal substantially equivalent thereto with the level of a predetermined reference signal and for producing a predetermined output signal when the level of the output signal of the photo-sensor array means exceeds the level of said reference signal; and a selection circuit for changing the cyclic interval of the base clock pulses supplied from said first electrical circuit means to said driver circuit means between at least a first cyclic interval and a second cyclic interval which is longer than the first cyclic interval, said selection circuit being electrically coupled to said first electrical circuit means and to said comparator circuit to change the cyclic interval of the base clock pulses generated by the first circuit means from the second cyclic interval to the first cyclic interval in response to the output signal of said comparator circuit.

55. A device according to claim 54, wherein said first electrical circuit means includes:

a base clock pulse generating circuit which generates base clock pulses at intervals in accordance with input voltage; and wherein said selection circuit is electrically coupled to said base clock pulse generating circuit to change the input voltage to the base clock pulse generating circuit from a second voltage value required for obtaining said second cyclic interval to a first voltage value required for obtaining said first cyclic interval in response to the output signal of said comparator circuit.

56. A device according to claim 50, wherein said control circuit means comprises:

first electrical circuit means electrically coupled to said driver circuit means for providing the driver circuit means with first intermittent base clock pulses; said driver circuit means being arranged for generating said scanning pulses on the basis of said first clock pulses supplied from the first electrical circuit means;

second electrical circuit means electrically coupled to said driver circuit means for providing said driver circuit means with second intermittent base clock pulses having a cyclic interval longer than that of said first base clock pulses, said driver circuit means generating said start pulses based on said second clock pulses supplied from said second circuit means; and third electrical circuit means for controlling the cyclic interval of said second clock pulses to be supplied from said second circuit means to said first circuit means in correspondence with the object brightness, said third electrical circuit means being electrically coupled to said second circuit means.

57. A device according to claim 56, wherein said second electrical circuit means is electrically coupled to said first electrical circuit means to produce said second clock pulses by frequency dividing said first clock pulses; and wherein said control circuit means further comprises:

fourth electrical circuit means for controlling the cyclic intervals at which said first clock pulses are generated in correspondence to the object brightness, said fourth electrical circuit means being electrically coupled to said first electrical circuit means.

58. A device according to claim 57, wherein said control circuit means further comprises:

fifth electrical circuit means for controlling the operation of said third and fourth electrical circuit means, said fifth electrical circuit means being electrically coupled to said third and fourth electrical circuit means to actuate at least one of the third and the fourth circuit means in correspondence with the brightness of the object.

59. A focus detecting device for detecting the focusing of an image forming optical system relative to an object, said optical system having an optical axis and being adjustable along the axis so as to form an image of the object on a predetermined focusing plane, said device comprising:

(A) photo-sensor array means having a plurality of photo-sensor elements of an electric charge storing and discharging type, said array means being positioned substantially corresponding to said focusing plane, each photo-sensor element being arranged to discharge an amount of stored electric charge corresponding to an integrated amount of light incident thereon;

(B) driver circuit means for electrically driving said photo-sensor array means, said driver circuit means being electrically coupled to the array means to provide the array means with intermittent start pulses having a cyclical interval and intermittent scanning pulses and for driving the array means to cause it to produce, one after another in time series, signals corresponding to electric charge discharged from each photo-sensor element during a period of time corresponding to the cyclical interval of said start pulses, said electric charge being discharged from each photo-sensor element in correspondence with the brightness of each portion in the image corresponding to the photo-sensor element within said period of time;

(C) signal processing circuit means for processing the output signal of said photo-sensor array means, said processing circuit means being electrically coupled to the array means to provide an electrical output representative of the focusing of the optical system with respect to the object, on the basis of said output signal of the array means;

(D) control circuit means for adjusting the scanning recycle time duration to correspond to the brightness of the object, said control circuit being electrically coupled to said driver circuit means to adjust the scanning recycle time duration by adjusting the cyclic interval of said start pulses applied to said array means in correspondence with the brightness of the object; and (E) said control circuit means including detecting means for detecting the brightness of at least a portion of the image appearing at the photo-sensor array means within a period of time, means for establishing a range of reference values and control means for adjusting the scanning recycle time duration in response to said detecting means detecting that the instantaneous brightness of at least a portion of the image appearing at the photo-sensor array means deviates from the predetermined range of reference values.

60. A range finding device for detecting the distance between the device and an object, comprising:

(A) a range finding optical system forming two images of said object with a relative positional difference corresponding to the distance to the object;

(B) photo-sensor array means arranged to receive said two images formed by said range finding optical system and to provide electrical signals representative of the relative position of one of said two images with respect to the position of the other image; said array means having a plurality of photo-sensor elements of an electric charge storing and discharging type, each photo-sensor element being arranged to discharge an amount of stored electric charge corresponding to an integrated amount of light incident thereon;

(C) driver circuit means for electrically driving said photo-sensor array means, said driver circuit means being electrically coupled to the array means to provide the array means with intermittent start pulses having a cyclical interval and intermittent scanning pulses and for driving the array means to cause it to produce, one after another in time series, signals corresponding to electric charge discharged from each photo-sensor element during a period of time corresponding to the cyclical interval of said start pulses, and for discharging said electric charge from each photo-sensor element in correspondence with the brightness of each portion of the image corresponding to a photo-sensor element within said period of time;

(D) detecting circuit means electrically coupled to said photo-sensor array means to detect the distance to the object and to produce an electrical output representative of the distance between the range finding device and the object by processing said electrical signals of the array means;

(E) control circuit means for adjusting the electric charge discharging time of said photo-sensor elements in said array means in correspondence with the object brightness, said control circuit means being electrically coupled to said driver circuit means to adjust the electric charge discharging time of said photo-sensor elements by adjusting the cyclical interval of the start pulses from said driver circuit means to the array means in correspondence with the object brightness; and (F) said control circuit means including detecting means for detecting the brightness of at least a portion of the image appearing at the photo-sensor array means within a period of time, means for establishing a range of reference values and control means for adjusting the scanning recycle time duration in response to said detecting means detecting that the instantaneous brightness of at least a portion of the image appearing at the photo-sensor array means deviates from the predetermined range of reference values.

61. A focus detecting device for detecting the focusing of an image forming lens system relative to an object, said lens system having an optical axis and being adjustable along the axis, said device comprising:

(A) a range finding optical system operatively associated with said image forming lens system and forming two images of the object with a relative positional difference which corresponds to the deviation of the set position of the lens system from a position at which the lens system is properly focused on the object;

(B) photo-sensor array means arranged to receive the two images formed by said range finding optical system and to provide electrical signals representative of the relative position of one of said two images with respect to the position of the other image; said array means having a plurality of photo-sensor elements of an electric charge storing and discharging type, each photo-sensor element being arranged to discharge an amount of stored electric charge corresponding to an integrated amount of light incident thereon;

(C) driver circuit means for electrically driving said photo-sensor array means, said driver circuit means being electrically coupled to the array means to provide the array means with intermittent start pulses having a cyclical interval and intermittent scanning pulses and for driving the array means to cause it to produce, one after another in time series, signals corresponding to the electric charge discharged from each photo-sensor element during a period of time corresponding to the cyclical interval of said start pulses, said electric charge being discharged from each photo-sensor element in corresponding with the brightness of each portion in the image corresponding to the photo-sensor element within said period of time;

(D) signal processing circuit means for processing the electrical signals of said photo-sensor array means, said processing circuit means being electrically coupled to the array means to produce an electrical output representative of the focusing of said image forming lens system to the object, one the basis of said electrical signals of the array means;

(E) control circuit means for adjusting the scanning recycle time duration in correspondence with the brightness of the object, said control circuit being electrically coupled to said driver circuit means to accomplish the adjustment of the scanning recycle time duration by adjusting the cyclical interval of said start pulses to be applied to said array means in correspondence with the brightness of the object; and (F) said control circuit means including detecting means for detecting the brightness of at least a portion of the image appearing at the photo-sensor array means within a period of time, means for establishing a range of reference values and control means for adjusting the scanning recycle time duration in response to said detecting means detecting that the instantaneous brightness of at least a portion of the image appearing at the photo-sensor array means deviates from the predetermined range of reference values.

62. In a device comprising:

(a) optical means for forming one or more images of an object;

(b) sensing means arranged to receive said one or more images formed by said optical means to provide one or more image signals on said one or more images, said sensing means having one or more arrays of a plurality of electrical charge storing type or electrical charge discharging type sensing elements;

(c) circuit means responsive to said one or more image signals provided by said sensing means to provide an output signal representative of imaging condition of said one or more images formed by the optical means;

the improvement further comprising:

(A) time control means for controlling the electrical charge storing or electrical charge discharging time of said sensing elements in said sensing means, said time control means being capable of selecting a time from a plurality of different times; and (B) detection means for detecting whether the peak level of at least a portion of the output signal of said sensing means is above a predetermined first level and whether the peak level of at least a portion of the output signal of said sensing means is below a predetermined second level lower than said first level, said detection means providing a first signal when detecting that the peak level of at least a portion of the output signal of the sensing means is above said first level and providing a second signal when detecting that the peak level of at least a portion of the output signal of the sensing means is below the second level;

said time control means being coupled to said detection means and changing the electrical charge storing or electrical charge discharging time of said sensing elements to a shorter time in response to said first signal provided by the detection means and changing the electrical charge storing or electrical charge discharging time of said sensing elements to a longer time in response to said second signal provided by said detection means.

63. In a device comprising:

(a) optical means for forming one or more images of an object;

(b) sensing means arranged to receive said one or more images formed by said optical means to provide one or more image signals on said one or more images, said sensing means having one or more arrays of a plurality of electrical charge storing type or electrical charge discharging type sensing elements; and (c) circuit means responsive to said one or more image signals provided by said sensing means to provide an output signal representative of image condition of said one or more images formed by the optical means;

the improvement further comprising:
- (A) time control means for controlling the electrical charge storing or electrical charge discharging time of said sensing elements in said sensing means, said time control means being capable of selecting a time from a plurality of different times; and
- (B) detection means for detecting whether the peak level of at least a portion of the output signal of said sensing means is above a predetermined level, said detection means providing a signal when detecting that the peak level of at least a portion of the output signal of the sensing means is above said predetermined level;

said time control means being responsive to said signal provided by said detection means to change the electrical charge storing or electrical charge discharging time of said sensing elements to a shorter time.

64. In a device comprising:
- (a) optical means for forming one or more images of an object;
- (b) sensing means arranged to receive said one or more images formed by said optical means to provide one or more image signals on said one or more images, said sensing means having one or more arrays of a plurality of electrical charge storing type or electrical charge discharging type sensing elements; and
- (c) circuit means responsive to said one or more image signals provided by said sensing means to provide an output signal representative of imaging condition of said one or more images formed by the optical means;

the improvement further comprising:
- (A) time control means for controlling the electrical charge storing or electrical charge discharging time of said sensing elements in said sensing means, said time control means being capable of selecting a time from a plurality of different times; and
- (B) detection means for detecting whether the peak level of at least a portion of the output signal of said sensing means is below a predetermined level and for providing a signal when detecting that the peak level of at least a portion of the output signal of the sensing means is below said predetermined level;

said time control means being responsive to said signal provided by said detection means to change the electrical charge storing or electrical charge discharging time of said sensing elements to a longer time.

* * * * *